US012614873B2

(12) United States Patent
Amini et al.

(10) Patent No.: US 12,614,873 B2
(45) Date of Patent: Apr. 28, 2026

(54) CONCEALED SHALLOW-DEPTH RECEPTACLE

(71) Applicant: Apple Inc., Cupertino, CA (US)

(72) Inventors: Mahmoud R. Amini, Sunnyvale, CA (US); James M. Jeon, Mountain House, CA (US); Ayoub Yari Boroujeni, San Jose, CA (US); Jack B. Rector, III, San Ramon, CA (US); Caleb J. Flori, Saratoga, CA (US); Colin J. Abraham, Mountain View, CA (US); Youqun Dong, San Jose, CA (US); Brandon Y. Leung, San Jose, CA (US); Kevin Bui, Leamington (CA)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 18/380,613

(22) Filed: Oct. 16, 2023

(65) Prior Publication Data

US 2025/0112403 A1     Apr. 3, 2025

Related U.S. Application Data

(60) Provisional application No. 63/541,406, filed on Sep. 29, 2023.

(51) Int. Cl.
H01R 13/52          (2006.01)
G06F 13/42          (2006.01)
(52) U.S. Cl.
CPC ..... H01R 13/5213 (2013.01); G06F 13/4282 (2013.01)

(58) Field of Classification Search
CPC ........................ H01R 13/5213; G06F 13/4282
See application file for complete search history.

(56)                References Cited

U.S. PATENT DOCUMENTS

| | | | |
|---|---|---|---|
| 11,983,336 B1 * | 5/2024 | Goh ...................... | G06F 13/382 |
| 2013/0017696 A1 * | 1/2013 | Alvarez Rivera . | H01R 13/5213 |
| | | | 439/142 |
| 2016/0093979 A1 * | 3/2016 | Sprenger ........... | H01R 13/5213 |
| | | | 439/136 |
| 2017/0093087 A1 * | 3/2017 | Esmaeili ............ | H01R 13/6205 |
| 2019/0261957 A1 * | 8/2019 | Zaslavsky .............. | A61B 8/565 |
| 2019/0356210 A1 * | 11/2019 | Harrison ................ | H02K 33/00 |

* cited by examiner

*Primary Examiner* — Sean Gugger
(74) *Attorney, Agent, or Firm* — Kilpatrick Townsend & Stockton LLP

(57)                ABSTRACT

Connector receptacles and related structures that can be hidden and protected, and that have a low-profile or shallow depth. An example can provide an electronic device having a connector receptacle, where the connector receptacle can be hidden using a cover. The cover can hide the connector receptacle and protect it from debris. The connector receptacle can also have a shallow depth making it suitable for use in small devices. Various cover mechanisms can be used. These cover mechanisms can be bistable, that is they can have a stable open position and a stable closed position. There can be tactile feedback provided to a user as the user moves the cover from the open position to the closed position and from the closed position to the open position.

20 Claims, 29 Drawing Sheets

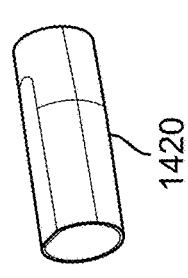
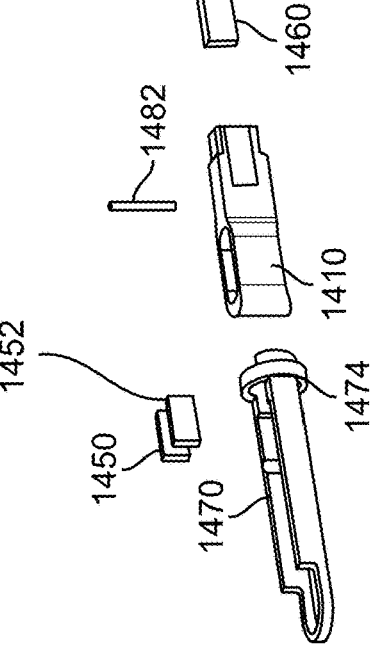
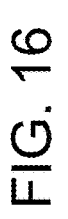
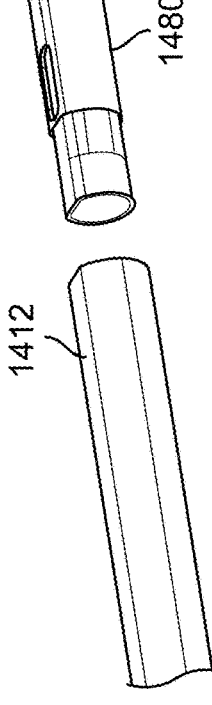
FIG. 16

1860

1850

1860

1850

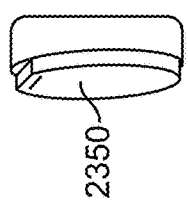
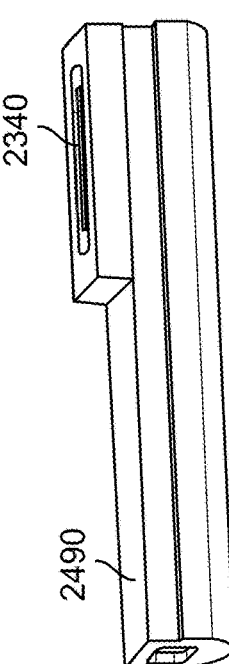
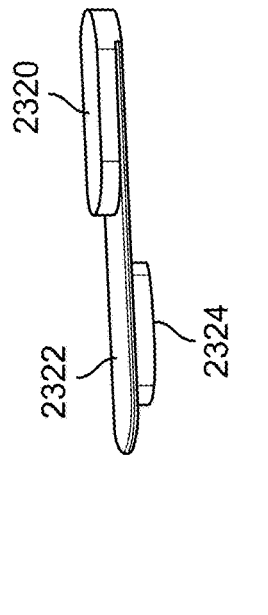
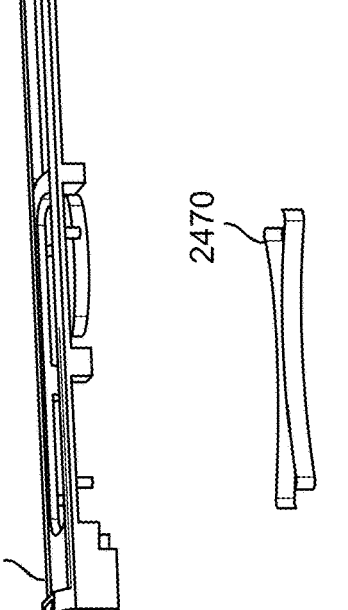
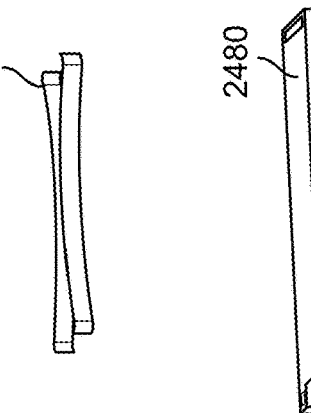
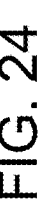
FIG. 24

CONCEALED SHALLOW-DEPTH RECEPTACLE

CROSS-REFERENCES TO RELATED APPLICATIONS

The present application claims the benefit of and priority to U.S. provisional application 63/541,406, filed Sep. 29, 2023, which is incorporated by reference.

BACKGROUND

The number of types of electronic devices that are commercially available has increased tremendously the past few years and the rate of introduction of new devices shows no signs of abating. Devices such as tablet computers, laptop computers, desktop computers, all-in-one computers, cell phones, storage devices, wearable-computing devices, portable media players, navigation systems, monitors and other display devices, power adapters, audio devices, and others, have become ubiquitous.

These electronic devices can communicate and share power over cables having plugs or connector inserts at each end, where the connector inserts can be inserted into connector receptacles in the electronic devices. These connector receptacles can be located along sides of devices, such as laptop computers, on a backside of larger devices, such as desktop computers, and at bottoms of smaller devices such as smart phones and charging cases for audio devices.

It can be desirable to add connector receptacles to very small devices. But an appearance of an opening for a connector receptacle on a small device can be poorly perceived. Also, small devices tend to be put in pockets where they can encounter lint and dust. These contaminants can work their way into a connector receptacle and hinder functionality and possibly damage the device. Thus, it can be desirable to hide these connector receptacles. It can also be desirable to protect them from lint and other debris.

It can also be problematic to fit a connector receptacle in a small electronic device. A connector receptacle can typically have a minimum depth that is needed to engage a corresponding connector insert and be compliant with a connector standard or specification. Thus, it can be desirable to have a low-profile or shallow-depth connector receptacle for use in these devices.

Thus, what is needed are connector receptacles and related structures that can be hidden and protected, and that have a low-profile or shallow depth.

SUMMARY

Accordingly, embodiments of the present invention can provide connector receptacles and related structures that can be hidden and protected, and that have a low-profile or shallow depth. An illustrative embodiment of the present invention can provide an electronic device having a connector receptacle, where the connector receptacle can be hidden using a cover. The cover can hide the connector receptacle and protect it from debris. The connector receptacle can also have a shallow depth making it suitable for use in small devices.

Various cover mechanisms can be used. These cover mechanisms can be bistable, that is they can have a stable open position and a stable closed position. There can be tactile feedback provided to a user as the user moves the cover from the open position to the closed position and from the closed position to the open position.

These and other embodiments of the present can provide an electronic device having a cover. The cover can slide away from a body of the electronic device to an open position thereby exposing a section of the electronic device. A connector receptacle can be located in the section and can be exposed when the cover slides away from the body. This can make the connector receptacle available for receiving a corresponding connector insert through which the electronic device can receive power, provide power, or share data, or a combination of these. The cover can slide towards the body of the electronic device to a closed position thereby covering and protecting the section of the electronic device and the connector receptacle.

These and other embodiments of the present can provide a connector receptacle having a shallow depth. The tongue can terminate in a frame that can extend at right angles from the tongue. Contacts can terminate in surface-mount contacting portions at a backside of the frame. The frame can be held in place in a molding or other housing structure. Contacts or pads of a flexible circuit board can connect to the surface-mount contacting portions to connect contacts of the connector receptacle to circuits of the electronic device.

These and other embodiments of the present can provide a cover that can provide a distinct open position and closed position by employing a canted coil spring. A body of an electronic device can include a first notch and a second notch. The cover can have a circumferential groove having a canted coil spring. The cover can slide relative to the body such that the canted coil spring moves to the first notch to be in the open position and the second notch to be in the closed position. The first notch and the second notch can both have sloped leading edges that can determine the tactile response provided to a user when opening or closing the cover.

These and other embodiments of the present can provide a cover that can provide a distinct open position and closed position by moving one or more magnets from a first attached position with a first ferro-material piece to a second attached position with a second ferro-material piece. The two magnetic attachments can provide distinct bistable positions. The making and breaking of these two magnetic attachments can provide a distinct tactile response to a user.

These and other embodiments of the present can provide a cover that can provide a distinct open position and closed position by employing a canted coil spring. A body of an electronic device can be attached to a cam that can have narrowed ends and a wider center. A cover can have a circumferential groove having a canted coil spring. The cover can slide relative to the cam such that the canted coil spring moves to the first narrow end to be in the open position and the second narrow end to be in the closed position. The first narrow end and the second narrow end can both have sloped surfaces that, along with the wider center, can determine the tactile response provided to a user when opening or closing the cover.

These and other embodiments of the present can provide a cover that can slide between a stable open position and a stable closed position. A middle position between the open position and closed position can be unstable due to opposing magnets. The open position can be made stable using the opposing magnets and a first physical constraint and the closed position can be made stable using the opposing magnets and a second physical constraint. The first physical constraint can be a housing portion attached to a body engaging a first end of a guide loop while the second physical constraint can be the housing portion engaging a second end of the guide loop, where guide loop circumferentially surrounds the housing portion.

These and other embodiments of the present can provide a cover that can rotate between a stable open position and a stable closed position. A middle position between the open position and closed position can be unstable due to opposing magnets. The open position can be made stable using the opposing magnets and a first physical constraint and the closed position can be made stable using the opposing magnets and a second physical constraint. The first physical constraint and the second physical constraint can be a pin on a rotating portion engaging stops on a body.

These and other embodiments of the present can provide a cover that can provide a distinct open position and closed position by employing a bowed spring. A body of an electronic device can be attached to the bowed spring that can have narrowed ends and a wider center. A cover can be attached to a pin. The cover can slide relative to the bowed spring such that the pin moves to the first narrow end to be in the open position and the second narrow end to be in the closed position. The first narrow end and the second narrow end can both have sloped surfaces that, along with the bowed center, can determine the tactile response provided to a user when opening or closing the cover. The bowed spring can be metal, spring steel, plastic, or other flexible material.

These and other embodiments of the present can provide a cover that can provide a distinct open position and closed position by employing a differential bowed spring. The differential bowed spring can be two bowed flexible members spaced a wider distance apart at their ends and are bowed to narrow their spacing away from the ends. The cover can include a puck on a bottom side. The puck can be at a first end of the differential bowed spring for the open position and at the second end of the differential bowed spring for the closed position. The differential bowed spring can provide a force on each side of the puck during the transition. This force can provide a stable closed position and a stable open position. The force of the differential bowed spring can provide a tactile response to a user when opening or closing the cover. The differential bowed spring can be metal, spring steel, plastic, or other flexible material.

These and other embodiments of the present can provide a cover that can provide a distinct open position and closed position by employing a differential clamp. The differential clamp can include a first prong and a second prong having facing portions that are angled. The first prong and a second prong can be flexible. When the cover is closed, the differential clamp can open to secure sloped features in an interior guide attached to the cover. When the cover is opened, the differential clamp can open to release the sloped features in the interior guide.

These and other embodiments of the present can provide a cover that can provide a distinct open position and closed position by employing an anvil that can engage a differential metal slider. The differential metal slider can be two bowed flexible members spaced a wider distance apart at their ends and are bowed to narrow their spacing away from the ends. The anvil can be attached to a connector receptable housing. The differential metal slider can be attached to an interior guide that is attached to the cover. The cover can move between a closed position and an open position by passing the anvil through the differential metal slider. The differential metal slider can provide a force on sides of the anvil. This force can provide a stable closed position and a stable open position. The force of the differential metal slider can provide a tactile response to a user when opening or closing the cover. The differential metal slider can be metal, spring steel, plastic, or other flexible material.

In various embodiments of the present invention, conductive portions of an electronic device can be formed by stamping, metal-injection molding, machining, micro-machining, 3-D printing, or other manufacturing process. The conductive portions can be formed of stainless steel, steel, copper, copper titanium, phosphor bronze, or other material or combination of materials. They can be plated or coated with nickel, gold, or other material. The nonconductive portions, such as housings, covers, and other structures can be formed using injection or other molding, 3-D printing, machining, or other manufacturing process. The nonconductive portions, such as the housing, covers, guides, and other portions, can be formed of silicon or silicone, rubber, hard rubber, plastic, nylon, liquid-crystal polymers (LCPs), ceramics, or other nonconductive material or combination of materials. The various springs, clamps, and metal sliders can be formed of spring steel, metal, plastic, or other flexible material.

Embodiments of the present invention can provide covers and connector receptacles for various types of devices, such as portable computing devices, tablet computers, desktop computers, laptops, all-in-one computers, wearable computing devices, cell phones, smart phones, media phones, storage devices, portable media players, navigation systems, monitors, audio devices, power supplies, writing implements, video delivery systems, adapters, remote control devices, chargers, and other devices. These connector adapters can provide interconnect pathways for signals that are compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. Other embodiments of the present invention can provide connector receptacles that can be used to provide a reduced set of functions for one or more of these standards. In various embodiments of the present invention, these interconnect paths provided by these connector receptacles can be used to convey power, ground, signals, test points, and other voltage, current, data, or other information.

Various embodiments of the present invention can incorporate one or more of these and the other features described herein. A better understanding of the nature and advantages of the present invention can be gained by reference to the following detailed description and the accompanying drawings.

BRIEF DESCRIPTION OF THE DRAWINGS

FIG. 16 is an exploded view of the electronic device of FIG. 14;

FIG. 17A through FIG. 17 F illustrate steps in manufacturing the electronic device of FIG. 14;

FIG. 24 is an exploded view of electronic device of FIG. 23A and FIG. 23B;

DESCRIPTION OF ILLUSTRATIVE EMBODIMENTS

Connector receptacles on small electronic devices can look distracting and can gather debris and contaminants. Connector receptacles can also be difficult to include in these small electronic devices. Accordingly, embodiments of the present invention can provide connector receptacles and related structures that can be hidden and protected, and that have a low-profile or shallow depth. An illustrative embodiment of the present invention can provide an electronic device having a connector receptacle, where the connector receptacle can be hidden using a cover. The cover can hide the connector receptacle and protect it from debris. The connector receptacle can also have a shallow depth making it suitable for use in small devices.

Various cover mechanisms can be used. These cover mechanisms can be bistable, that is they can have a stable open position and a stable closed position. There can be tactile feedback provided to a user as the user moves the cover from the open position to the closed position and from the closed position to the open position. While the cover is in the open position, a connector receptacle can be available for charging the electronic device, transferring data, providing power, or for other reason. While in the closed position the connector receptacle can be hidden and protected from debris. Examples are shown in the following figures.

Figure 1:
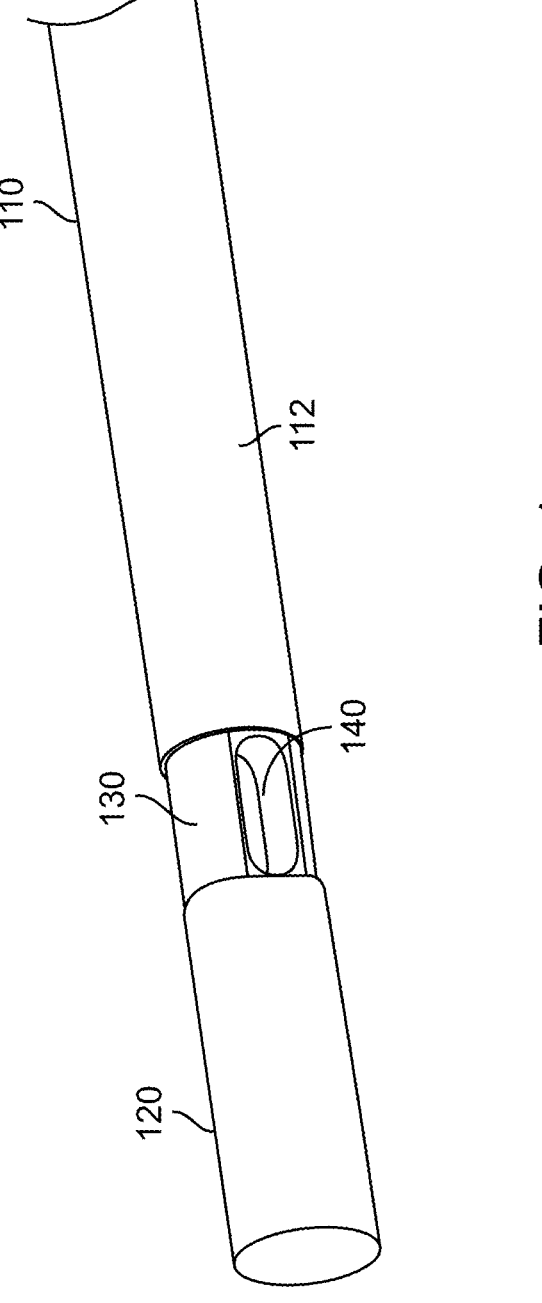
FIG. 1 illustrates a device incorporating a connector receptacle according to an embodiment of the present invention.

FIG. 1 illustrates a device incorporating a connector receptacle according to an embodiment of the present invention. This figure, as with the other included figures, is included for illustrative purposes and does not limit either the possible embodiments of the present invention or the claims.

Electronic device 110 can include cover 120. Cover 120 can slide away from body 112 of electronic device 110 to an open position to expose section 130. Connector receptacle 140 can be located in section 130 and can be accessed when cover 120 is in the open position. Cover 120 can slide toward body 112 of electronic device to a closed position to cover section 130 and connector receptacle 140. Covering section 130 and connector receptacle 140 can prevent or limit debris and other materials from entering connector receptacle 140 and possibly causing damage. Exposing section 130 in connector receptacle 140 can allow a corresponding connector insert (not shown) to be inserted into connector receptacle 140 for the transfer of power and data. For example, electronic device 110 can be charged through connector receptacle 140 when cover 120 is slid away from body 112 to the open position exposing section 130 and connector receptacle 140.

It can be difficult to fit a connector receptacle in electronic device 110 due to size constraints. Accordingly, embodiments of the present invention can provide a connector receptacle having a shallow depth. An example is shown in the following figure.

Figure 2:
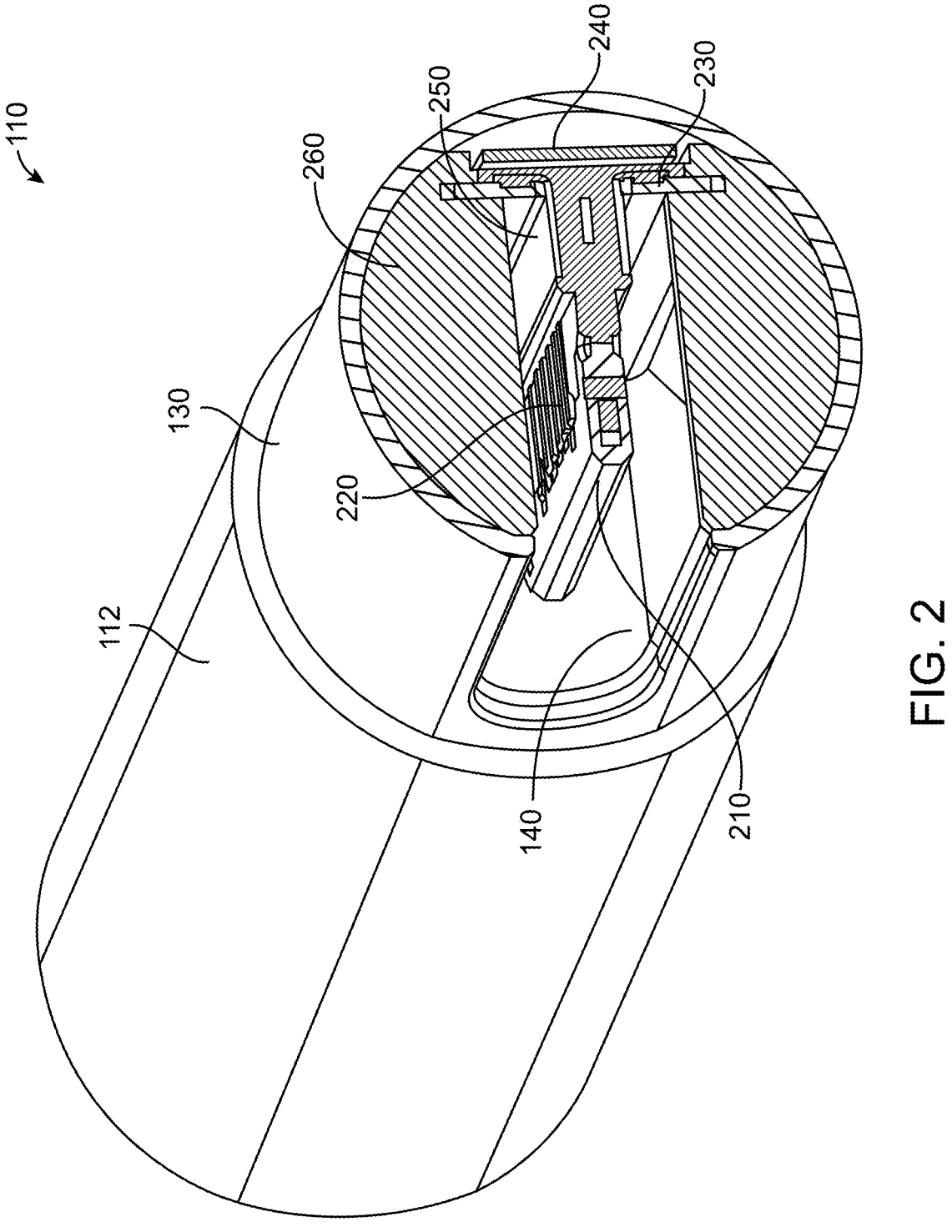
FIG. 2 illustrates a cutaway side view of the electronic device of FIG. 1.

FIG. 2 illustrates a cutaway side view of the electronic device of FIG. 1. Electronic device 110 can include body 112 and section 130. Connector receptacle 140 can be located in section 130. Connector receptacle 140 can include tongue 210 supporting contacts 220 on a top and bottom side. Tongue 210 can further support ground pads 250 on a top and bottom side. Tongue 210 can support frame 230, which can be held in place by molding 260. Contacts 220 can electrically connect to traces or pads on flexible circuit board 240. Flexible circuit board 240 can be routed to other locations in electronic device 110.

Connector receptacle 140 can be shallow by providing frame 230 at right angles to tongue 210. Frame 230 can be held in place by molding 260. Surface-mount contacting portions 222 (shown in FIG. 3) can be attached to a flexible circuit board that can route signals and voltages between contacts 220 on tongue 210 and other circuits in electronic device 110.

Figures 3A, 3B, 3C, 3D:
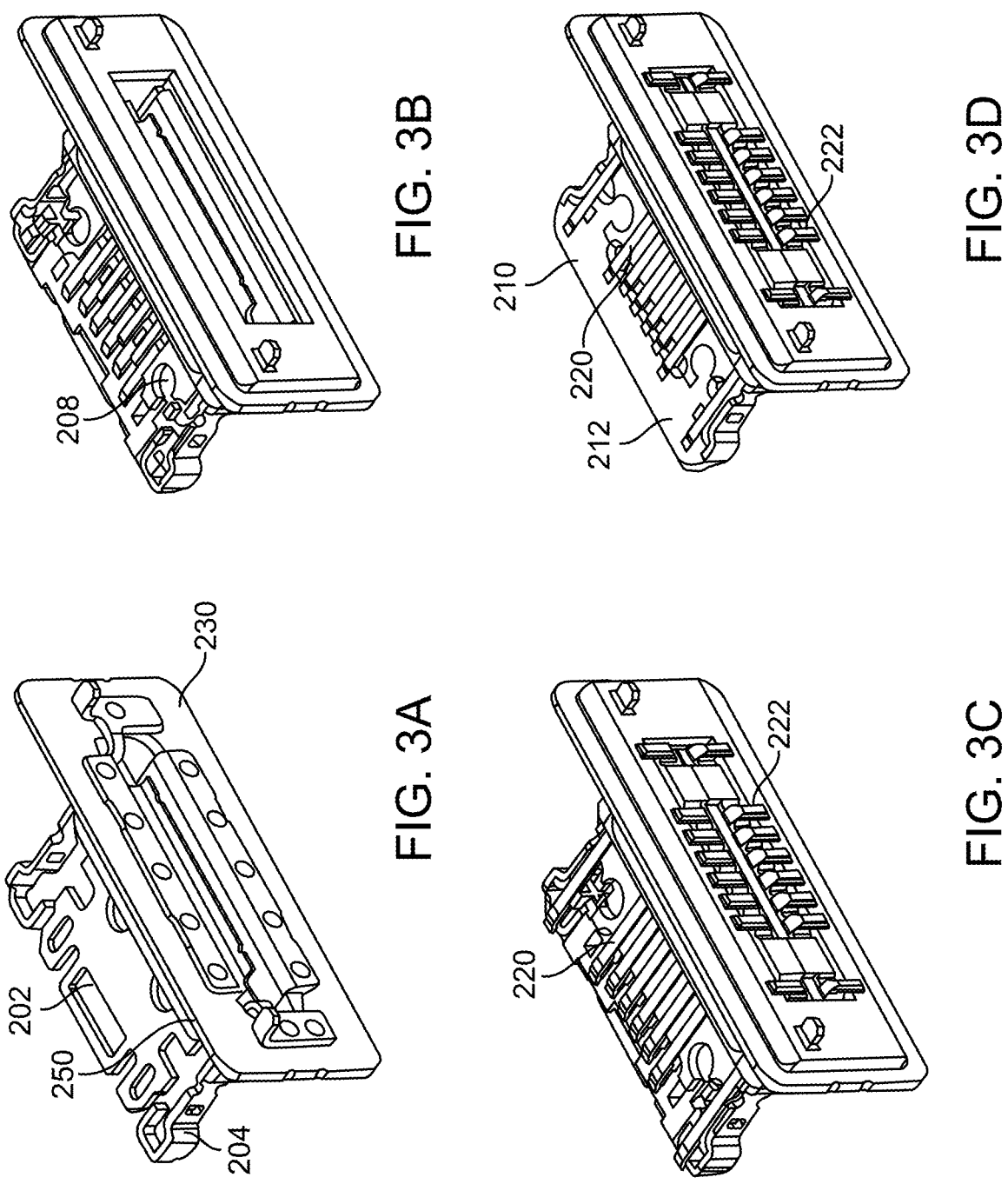
FIG. 3A through FIG. 3D illustrate a method of manufacturing a connector receptacle tongue according to an embodiment of the present invention.

FIG. 3A through FIG. 3D illustrate a method of manufacturing a connector receptacle tongue according to an embodiment of the present invention. In FIG. 3A, center ground plate 202, side ground contacts 204, and ground pads 250 can be attached, for example by laser welding, to frame 230. In FIG. 3B, a first molding 208 can be molded over center ground plate 202 and rear portions of frame 230. In FIG. 3C, contacts 220 can be added. Contacts 220 can include surface-mount contacting portions 222. In FIG. 3D, second overmolding 212 can be formed over front ends of contacts 220 and along a front edge of tongue 210. Surface-mount contacting portions 222 can attach to pads or traces not shown on flexible circuit board 240, as shown in FIG. 2.

Figure 4:
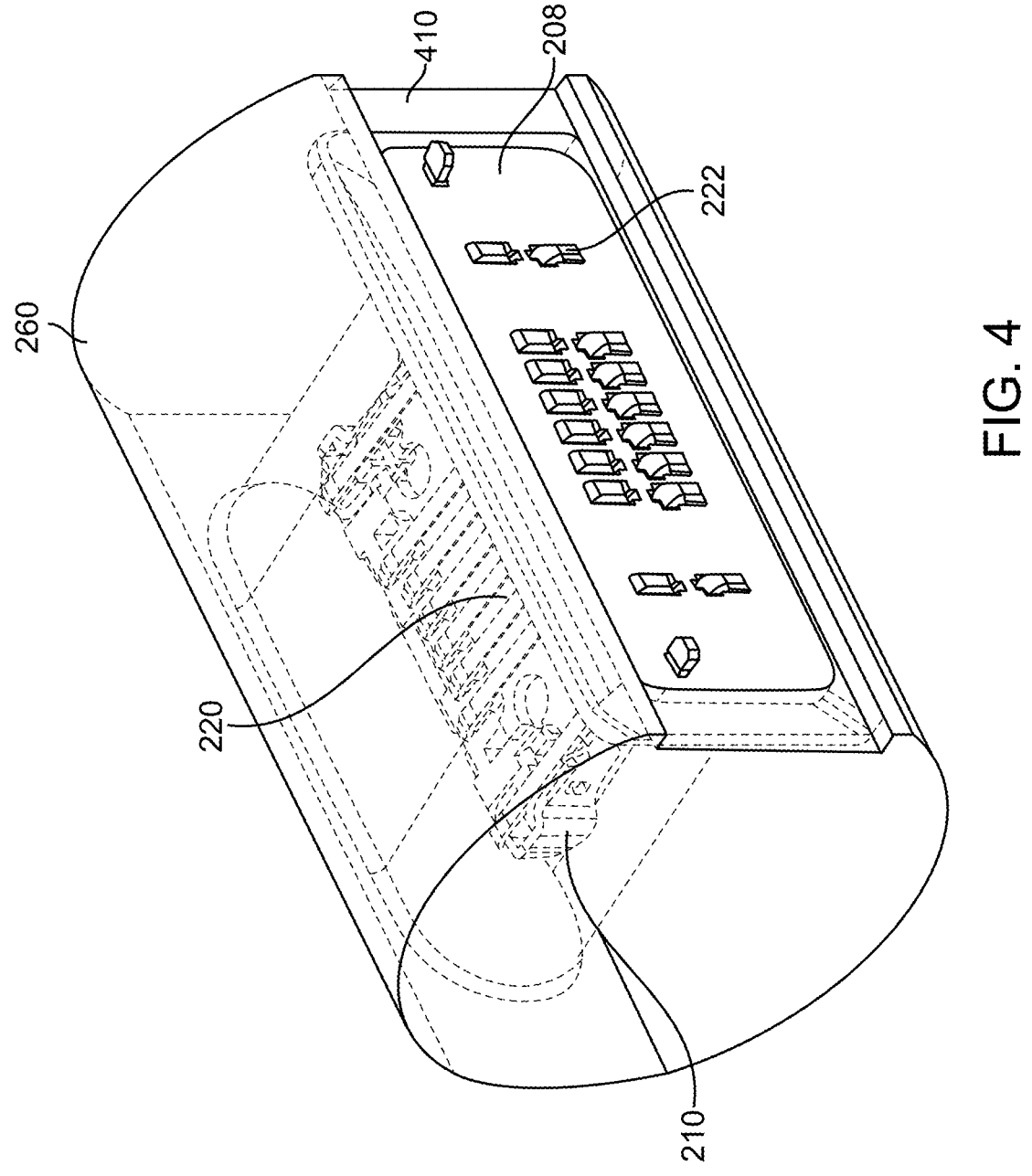
FIG. 4 illustrates a portion of the electronic device of FIG. 1.

FIG. 4 illustrates a portion of the electronic device of FIG. 1. In this example, tongue 210 can be located in molding 260. Tongue 210 can support contacts 220. A backside of first molding 208 supporting surface-mount contacting portions 222 of contacts 220 can be accessible in slot 410. Flexible circuit board 240 (shown in FIG. 2) can be placed in slot 410 and connected to surface-mount contacting portions 222 of contacts 220.

These and other embodiments of the present can provide a cover that can provide a distinct open position and closed position by employing a canted coil spring. A body of an electronic device can include a first notch and a second notch. The cover can have a circumferential groove having a canted coil spring. The cover can slide relative to the body such that the canted coil spring moves to the first notch to be in the open position and the second notch to be in the closed position. The first notch and the second notch can both have sloped leading edges that can determine the tactile response provided to a user when opening or closing the cover. An example is shown in the following figures.

Figure 5:
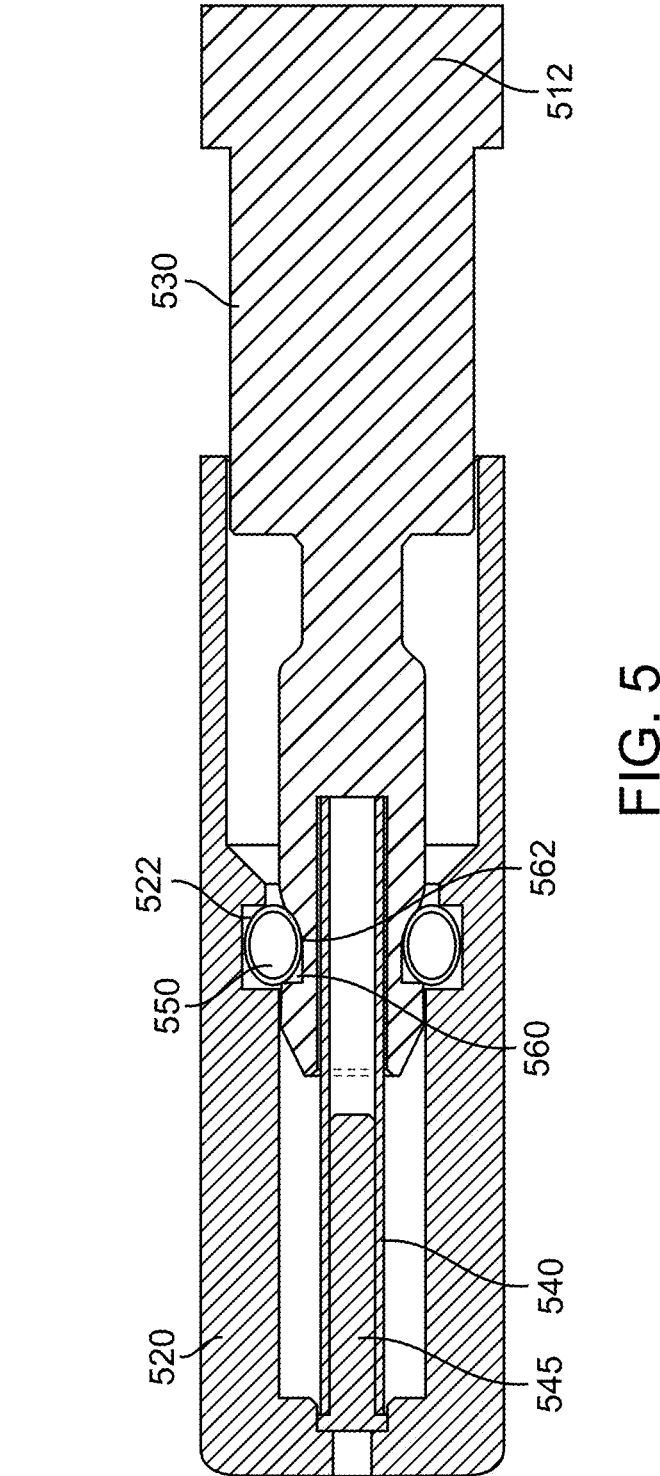
FIG. 5 is a cutaway side view of another electronic device according to an embodiment of the present invention.

FIG. 5 is a cutaway side view of another electronic device according to an embodiment of the present invention. In this example, cover 520 can slide to cover or expose section 530. Cover 520 can slide toward body 512 of electronic device 500 to a closed position to cover section 530. Cover 520 can slide away from body 512 of electronic device 500 to an open position to expose section 530. A connector receptacle (not shown) can be located in section 530. Cover 520 can be attached to pin 545. Pin 545 can extend through a center of spring 540. Spring 540 can compress and expand as cover 520 is opened and closed.

It can be desirable to provide distinct open and closed positions for cover 520. That is, it can be desirable to provide a distinct open position for cover 520 where section 530 and the connector receptacle is exposed. It can also be desirable to provide a distinct closed position for cover 520 where section 530 is hidden. A distinct position can be identified by a tactile response that can be provided to a user. In this example, that tactile response can be provided by canted coil spring 550. Canted coil spring 550 can be positioned in groove 522 in cover 520. In the open position as shown, section 530 can be exposed, and canted coil spring 550 can be located in notch 560 of body 512. Notch 560 can include leading edge 562. A slope of leading edge 562 can determine a tactile response that is provided to a user when the open position is reached.

Figure 6:
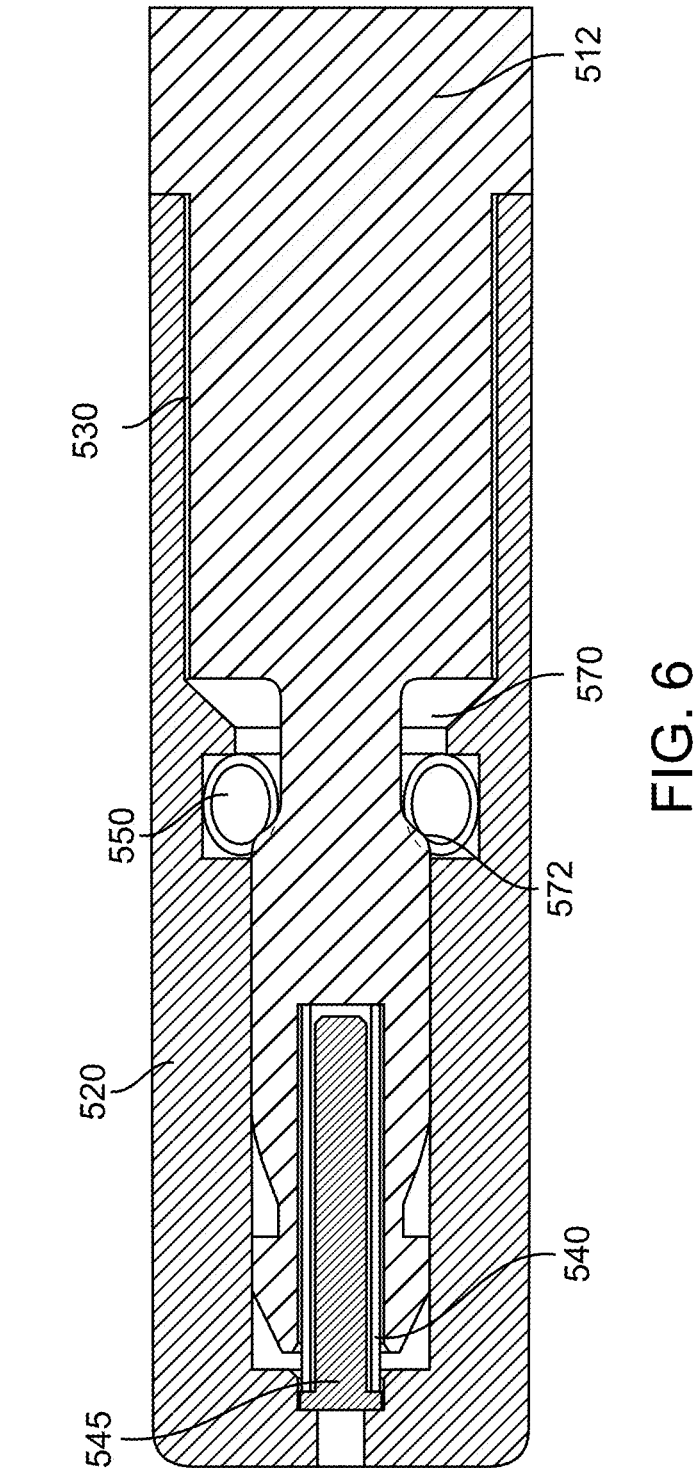
FIG. 6 is another cutaway side view of the electronic device shown in FIG. 5.

FIG. 6 is another cutaway side view of the electronic device shown in FIG. 5. In this example, electronic device 500 can be in the closed position. Cover 520 can cover section 530 and the connector receptacle (not shown.) Pin 545 can extend through a center of spring 540. Canted coil spring 550 can be located in notch 570 in body 512. Notch 570 can have a leading edge 572. A slope of leading edge 572 can determine a tactile response that is provided to a user when the closed position is reached.

These and other embodiments of the present can provide a cover that can provide a distinct open position and closed position by moving one or more magnets from a first attached position with a first ferro-material piece to a second attached position with a second ferro-material piece. The two magnetic attachments can provide distinct bistable positions. The making and breaking of these magnetic attachments can provide a distinct tactile response to a user. An example is shown in the following figures.

Figure 7:
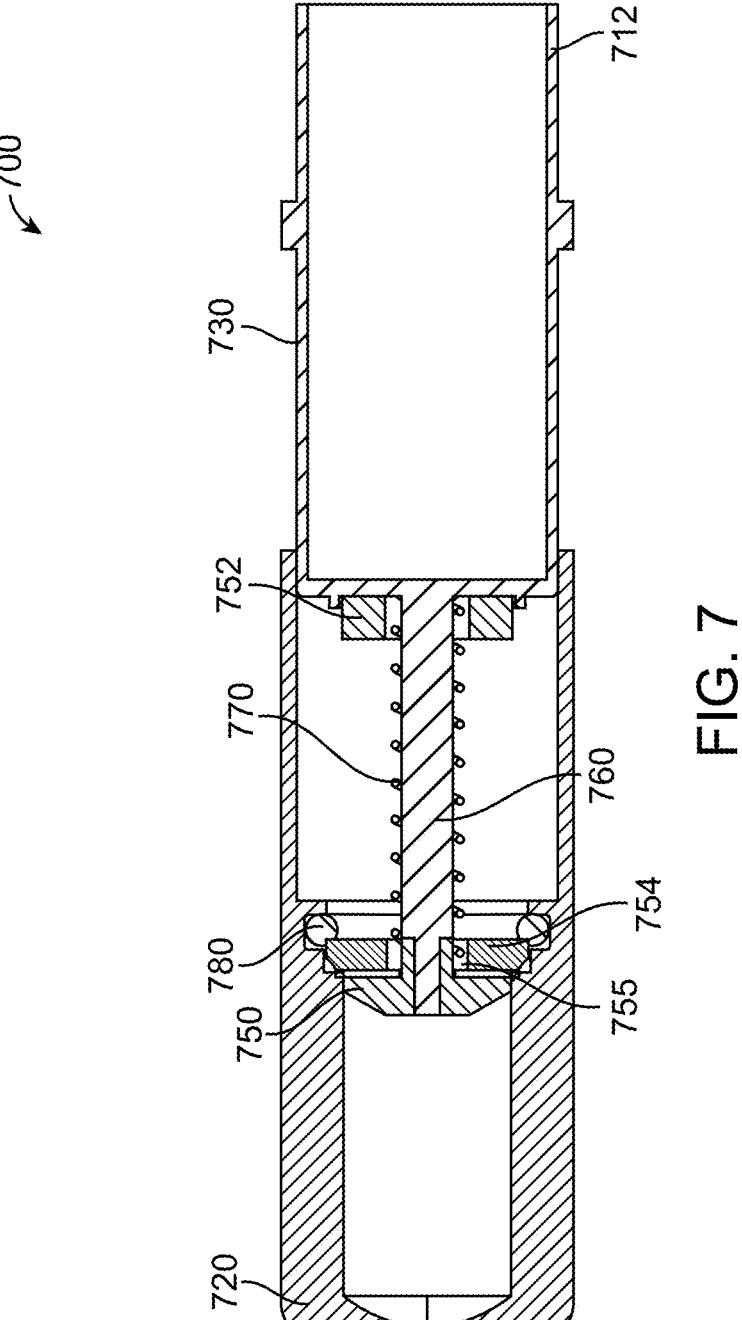
FIG. 7 is a cutaway side view of an electronic device according to an embodiment of the present invention.

FIG. 7 is a cutaway side view of an electronic device according to an embodiment of the present invention. Electronic device 700 can include cover 720. Cover 720 can slide towards body 712 and cover section 730 of electronic device 700. A connector receptacle (not shown) can be located in section 730. Stem 760 can extend from body 712. Stem 760 can be attached to ferro-material piece 750. Spring 770 can be coiled around stem 760. Magnet 754 can be attached to cover 720. In an open position, magnet 754 can be magnetically attached to ferro-material piece 750. Ferro-material piece 752 can be attached to body 712. O-ring 780 can be included to help maintain a good fit between cover 720 and body 712. As cover 720 is closed, thereby covering section 730 and the connector receptacle, stem 760 can pass through central opening 755 in magnet 754. Spring 770 can compress until magnet 754 can attach to ferro-material piece 752.

In this way, spring 770 can maintain cover 720 in the open position. Magnet 754 can be magnetically attached to ferro-material piece 750, also maintaining cover 720 in the open state. Cover 720 can be closed and magnet 754 can magnetically attach to ferro-material piece 752, thereby maintaining cover 720 and the closed position. The making and breaking of these magnetic connections can provide a tactile feel for a user. The ferro-material piece 750 and ferro-material piece 752 can be formed of a ferromagnet material. Magnet 754 can be a single magnet, or magnet 754 can be multiple magnets.

Figure 8:
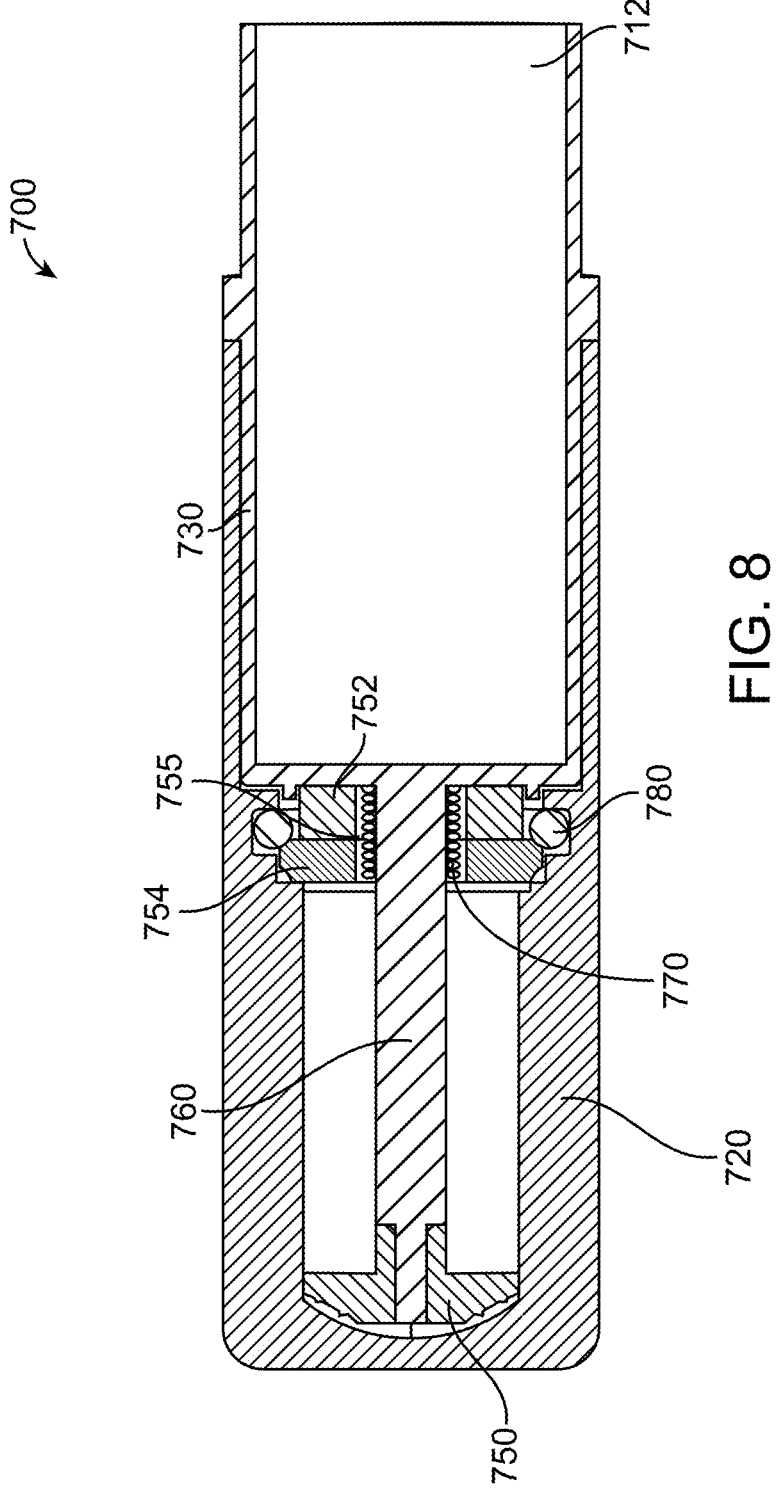
FIG. 8 is a cutaway side view of electronic device of FIG. 7.

FIG. 8 is a cutaway side view of electronic device of FIG. 7. Electronic device 700 can include cover 720. Cover 720 has been slid towards body 712 to cover section 730 of electronic device 700. A connector receptacle (not shown) can be located in section 730. Stem 760 can extend from body 712. Stem 760 can be attached to ferro-material piece 750. Spring 770 can be compressed and coiled around stem 760. In this closed position, magnet 754, which is attached to cover 720, can be magnetically attached to ferro-material piece 752. Ferro-material piece 752 can be attached to body 712. O-ring 780 can be included to help maintain a good fit between cover 720 and body 712. As cover 720 is closed, thereby covering section 730 and the connector receptacle, stem 760 can pass through central opening 755 in magnet 754. Spring 770 can compress as shown such that magnet 754 can mate with ferro-material piece 752.

In this way, cover 720 can be closed and magnet 754 can magnetically attach to ferro-material piece 752, thereby maintaining cover 720 and the closed position. The making and breaking of these magnetic connections can provide a tactile feel for a user. The ferro-material piece 750 and ferro-material piece 752 can be formed of a ferromagnet material. Magnet 754 can be a single magnet, or magnet 754 can be multiple magnets.

These and other embodiments of the present can provide a cover that can provide a distinct open position and closed position by employing a canted coil spring. A body of an electronic device can be attached to a cam that can have narrowed ends and a wider center. A cover can have a circumferential groove holding the canted coil spring. The cover can slide relative to the cam such that the canted coil spring moves to a first narrow end to be in the open position and a second narrow end to be in the closed position. The first narrow end and the second narrow end can both have sloped surfaces that, along with the wider center, can determine the tactile response provided to a user when opening or closing the cover. An example is shown in the following figures.

Figure 9:
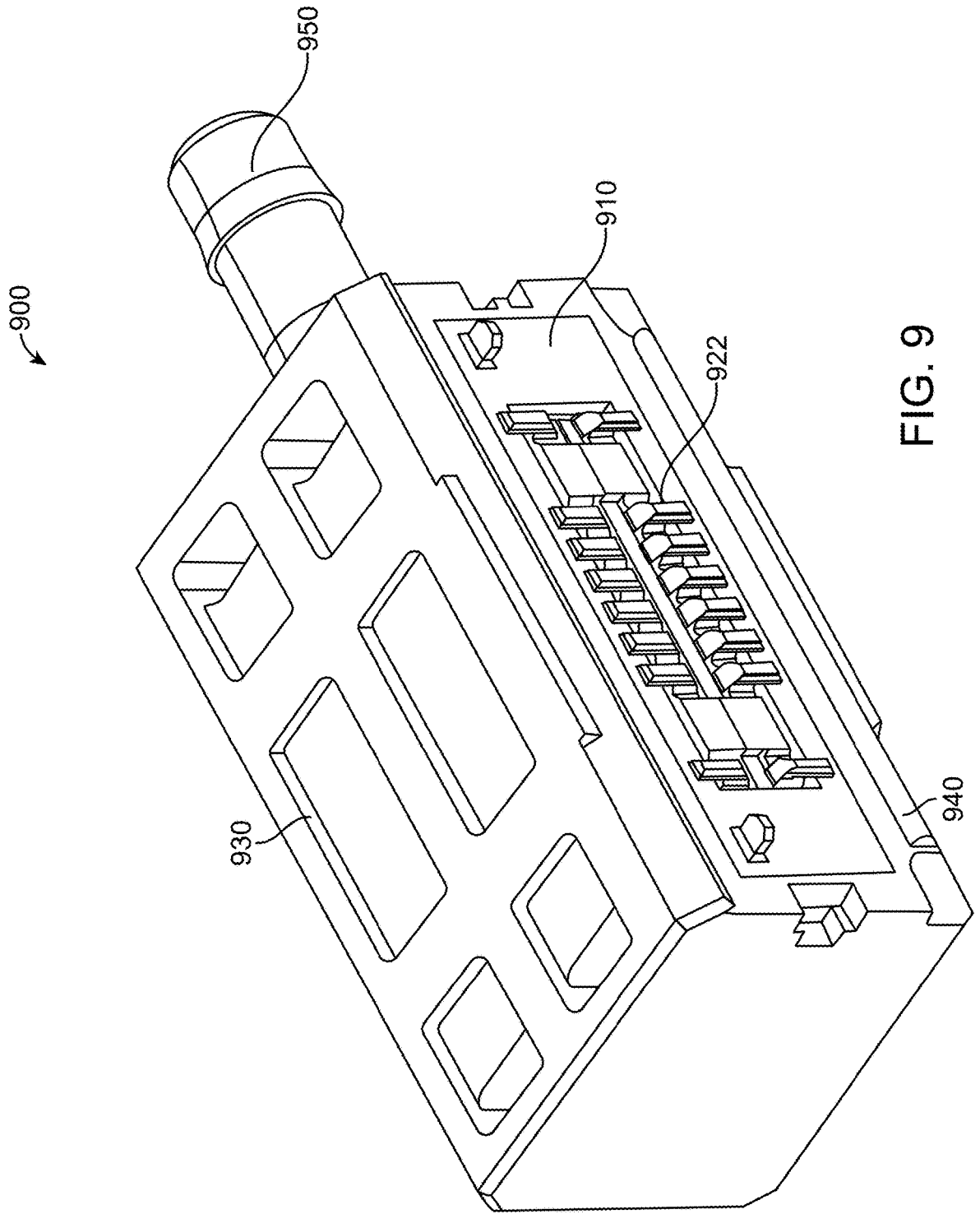
FIG. 9 illustrates a receptacle module according to an embodiment of the present invention.

FIG. 9 illustrates a receptacle module according to an embodiment of the present invention. Receptacle module 900 can provide a connector receptacle that can be used in various devices. Receptacle module 900 can include tongue 910 having surface-mount contacting portions 922. Tongue 910 can be positioned in housing 930. Slot 940 can be formed in a back side of housing 930. Slot 940 can accept a flexible circuit board, such as flexible circuit board 240 (shown in FIG. 2.) Housing 930 can include extension 950.

Figure 10:
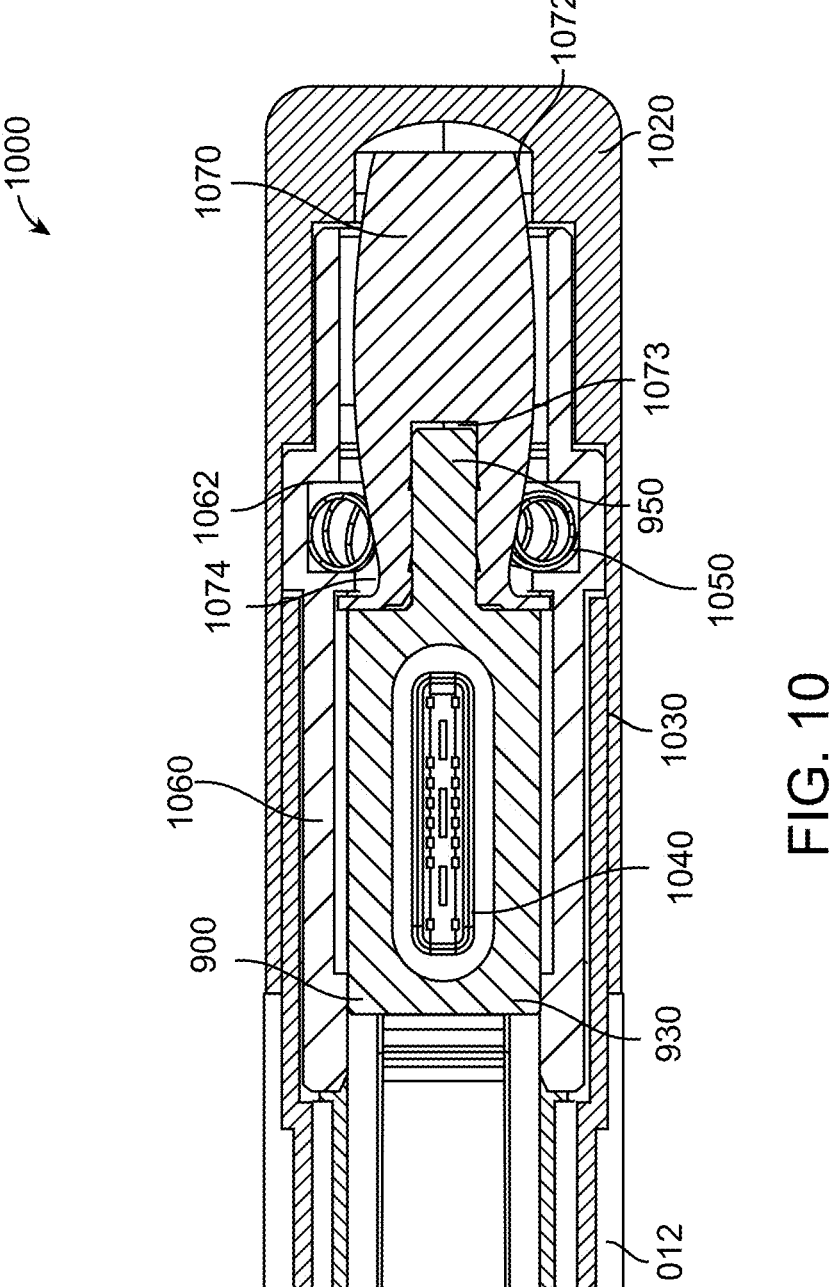
FIG. 10 is a cutaway side view of another electronic device according to an embodiment of the present invention.

FIG. 10 is a cutaway side view of another electronic device according to an embodiment of the present invention. Electronic device 1000 can utilize receptacle module 900. Connector receptacle 1040 can be located in housing 930. Housing 930 can be attached to body 1012 of electronic device 1000. Extension 950 of housing 930 can be inserted into opening 1073 in cam 1070. In this way, cam 1070 can be attached to housing 930. Sliding guide 1060 can be attached to cover 1020. Canted coil spring 1050 can be located in circumferential groove 1062 of sliding guide 1060. Cover 1020 can be slid away from body 1012 of electronic device 1000 to expose section 1030 and connector receptacle 1040. In this open position, shown in FIG. 11, canted coil spring 1050 can be at narrow portion 1072 of cam 1070. Cover 1020 can be slid towards body 1012 to cover section 1030 and connector receptacle 1040. In this closed position, shown here, canted coil spring 1050 can be at narrow portion 1074 of cam 1070. Cover 1020 can be slid away body 1012 to expose section 1030 and connector receptacle 1040. This is shown in the following figure.

Figure 11:
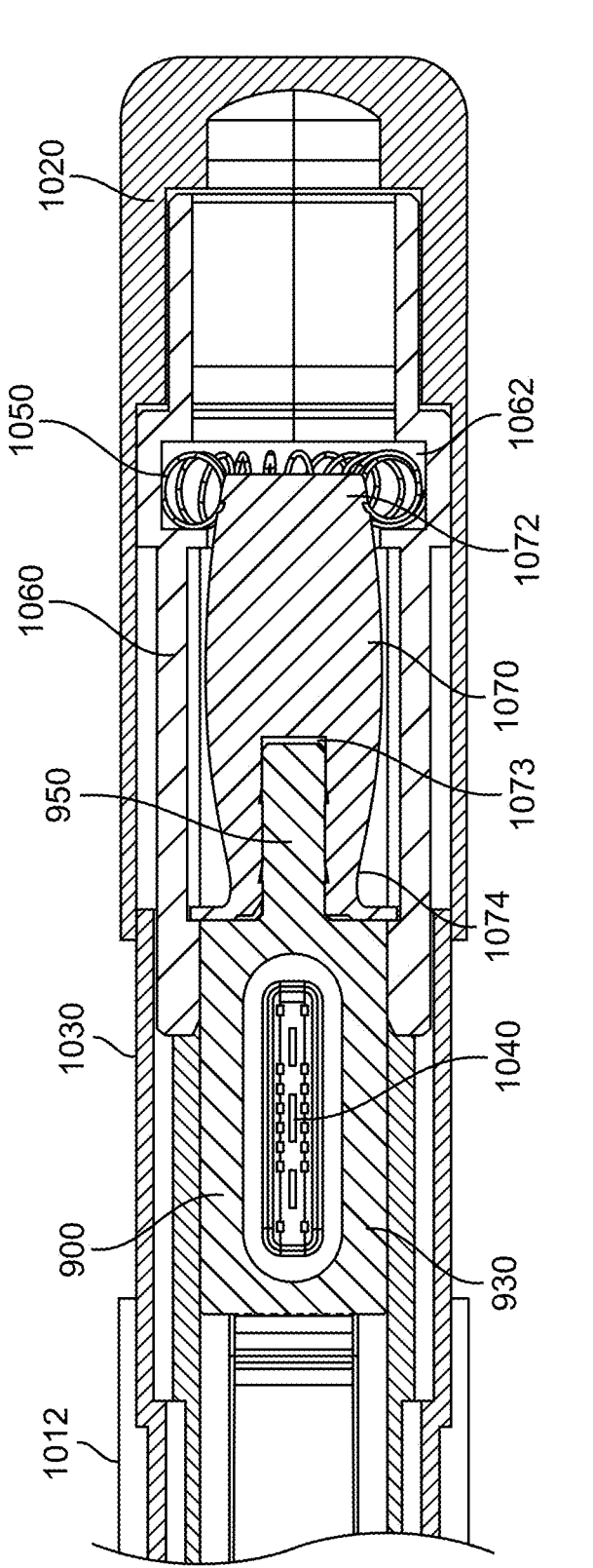
FIG. 11 is a cutaway side view of the electronic device in FIG. 10.

FIG. 11 is a cutaway side view of the electronic device in FIG. 10. Cover 1020 is open and exposes section 1030 and connector receptacle 1040 of electronic device 1000. Receptacle module 900 can include housing 930 supporting connector receptacle 1040. Housing 930 can include extension 950 which can be inserted into opening 1073 of cam 1070. Canted coil spring 1050 can be located in circumferential groove 1062 of sliding guide 1060. In the closed position, shown in FIG. 10, canted coil spring 1050 can be aligned with narrow portion 1074 of cam 1070. In the open position shown here, canted coil spring 1050 can be aligned with narrow portion 1072 of cam 1070. The slopes of narrow portions 1072 and 1074 of cam 1070, as well as the curvature of cam 1070, can provide a tactile response to be user as cover 1020 is slid between a closed and an open position and from an open to a closed position. The engagement of canted coil spring 1050 with narrow portions 1072 and 1074 of cam 1070 can provide a cover 1020 that has a stable open position and a stable closed position.

Figure 12:
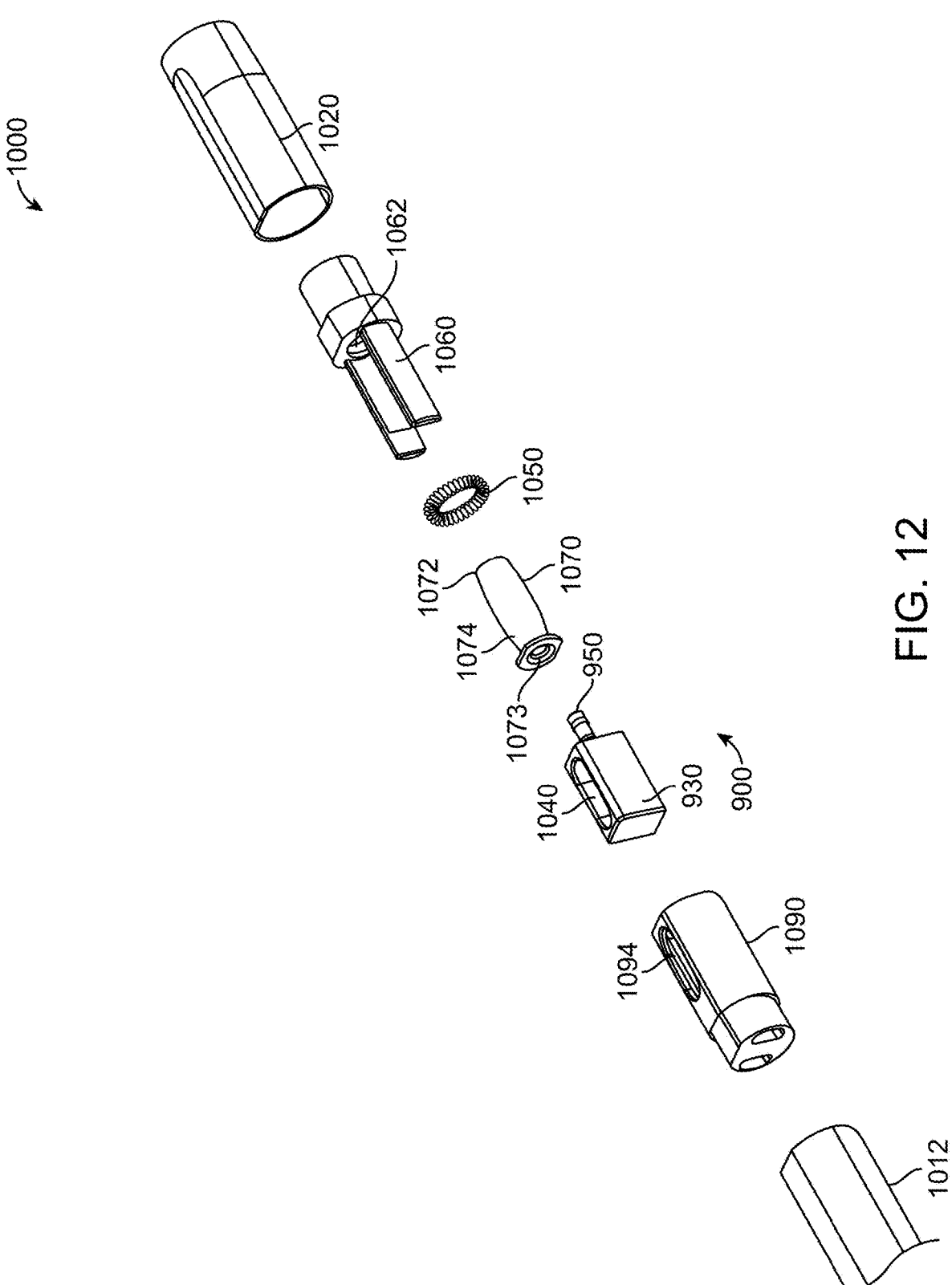
FIG. 12 is an exploded view of the electronic device of FIG. 10.

FIG. 12 is an exploded view of the electronic device of FIG. 10. Electronic device 1000 can include cover 1020. Sliding guide 1060 can be attached to cover 1020. Canted coil spring 1050 can fit in circumferential groove 1062 of sliding guide 1060. Cam 1070 can be inserted into sliding guide 1060 and can slide with in its confines. Cam 1070 can include narrow portion 1072 and narrow portion 1074. Cam 1070 can include opening 1073 for mating with extension 950 of housing 930 of receptacle module 900. Receptacle module 900 can further include connector receptacle 1040. Receptacle module 900 can be housed in molding 1090. Molding 1090 can include opening 1094 for connector receptacle 1040. Electronic device 1000 can further include body 1012.

Figures 13A, 13B, 13C, 13D:
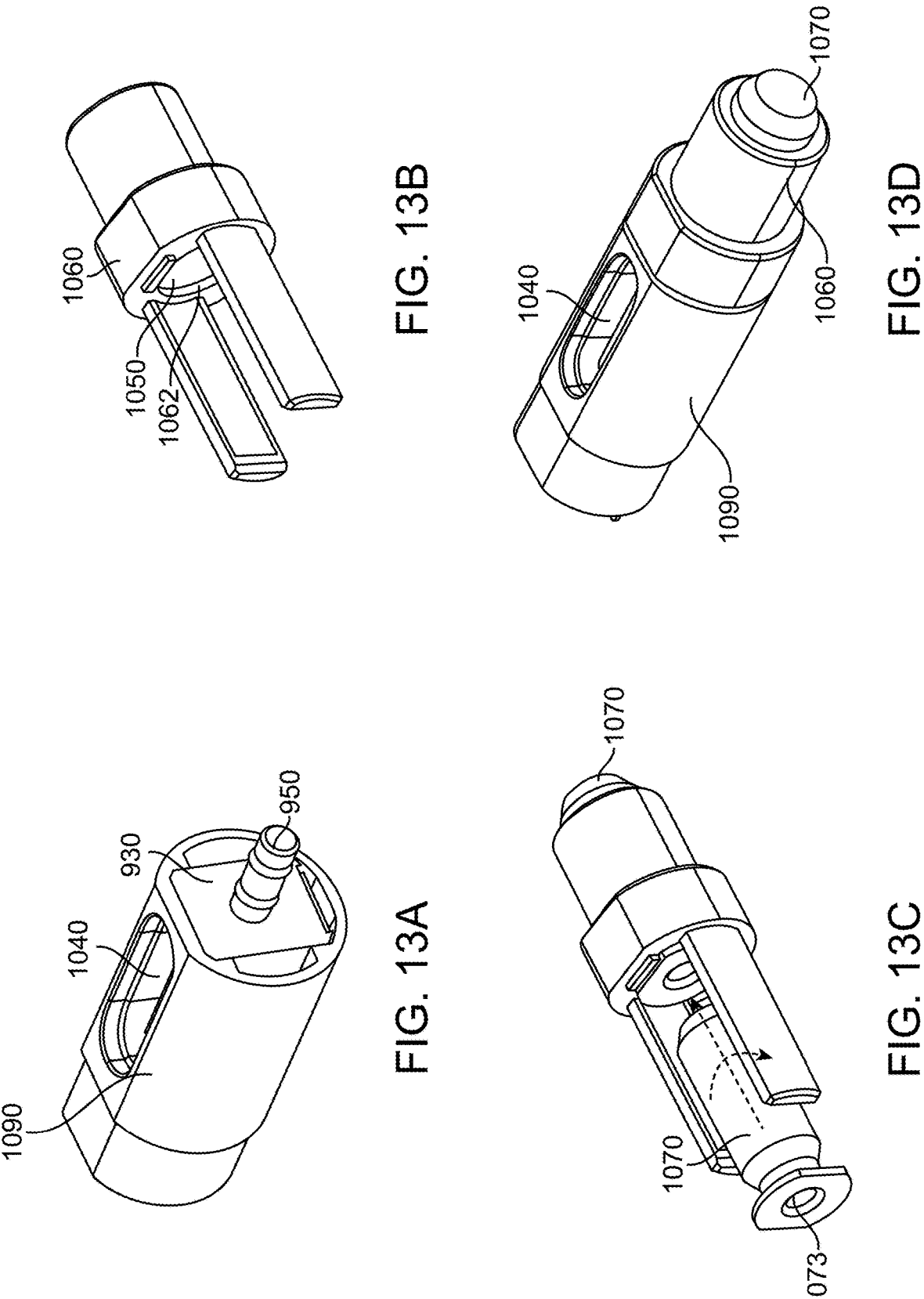
FIG. 13A through FIG. 13D illustrate manufacturing steps for a portion of the electronic device of FIG. 10.

FIG. 13A through FIG. 13D illustrate manufacturing steps for a portion of the electronic device of FIG. 10. In FIG. 13A, housing 930 can be inserted into or over molded by molding 1090. Housing 930 can include extension 950. Molding 1090 can include an opening for connector receptacle 1040. In FIG. 13B, canted coil spring 1050 can be inserted into sliding guide 1060. Specifically, canted coil spring 1050 can be inserted into circumferential groove 1062 of sliding guide 1060. In FIG. 13C, cam 1070 can be inserted into sliding guide 1060. As indicated, cam 1070 can be rotated to overcome resistance by canted coil spring 1050. In FIG. 13D, extension 950 can be fit into opening 1073 in cam 1070. Molding 1090 can include an opening for connector receptacle 1040. Cam 1070 can be attached to housing 930. Sliding guide 1060 can slide relative to cam 1070, allowing cover 1020 to either allow access to connector receptacle 1040 or to hide connector receptacle 1040.

These and other embodiments of the present can provide a cover that can slide between a stable open position and a stable closed position. A middle position between the open position and closed position can be unstable due to opposing magnets. The open position can be made stable using the opposing magnets and a first physical constraint and the closed position can be made stable using the opposing magnets and a second physical constraint. An example is shown in the following figures.

Figure 14:
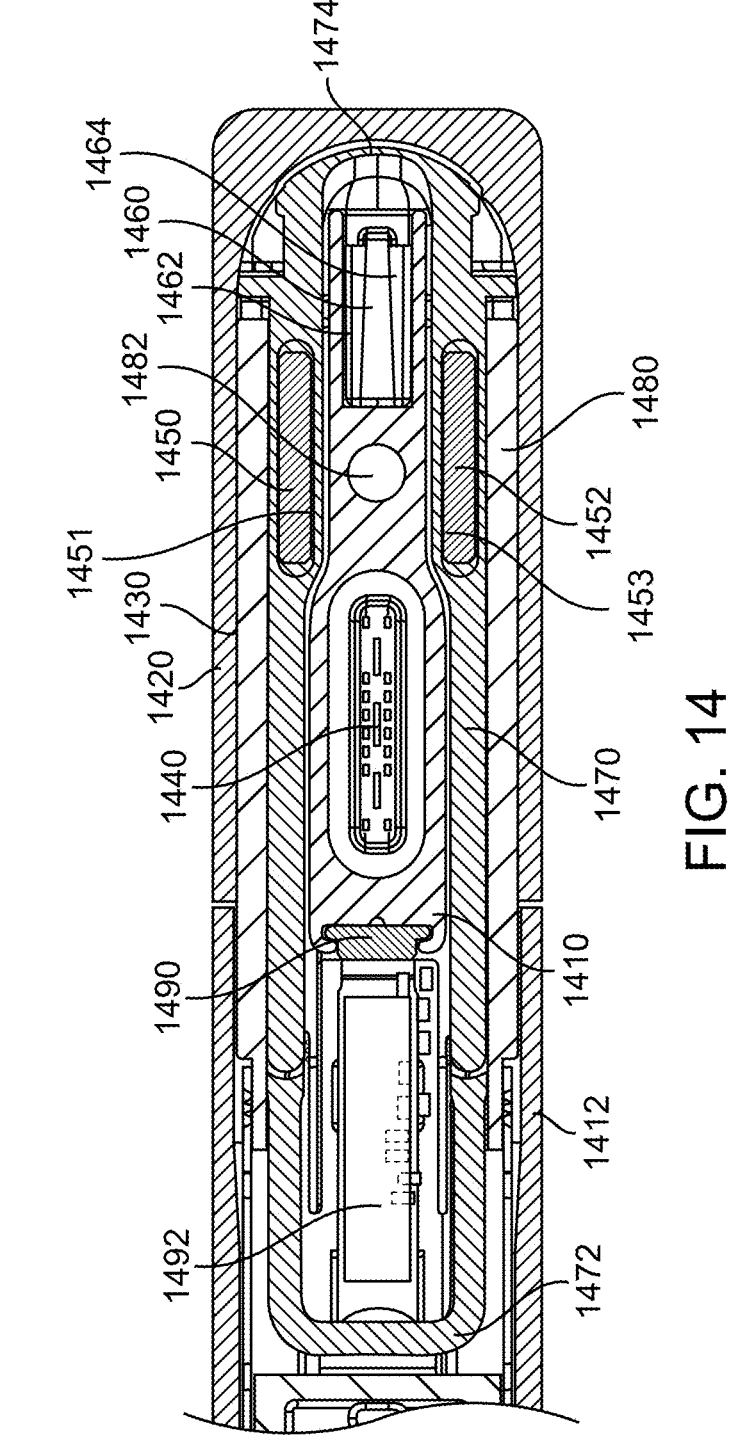
FIG. 14 is a cutaway side view of another electronic device according to an embodiment of the present invention.

FIG. 14 is a cutaway side view of another electronic device according to an embodiment of the present invention. Electronic device 1400 can include connector receptacle 1440 supported by housing 1410. First magnet 1460 can be attached to housing 1410. Guide loop 1470 can encircle housing 1410. Guide loop 1470 can include second magnet 1450 and third magnet 1452. Guide loop 1470 can be positioned in housing 1480. Cover 1420 is shown in a closed position over housing 1480 and connector receptacle 1440. Housing 1480 can connect to body 1412 of electronic device 1400. Pin 1482 can secure housing 1410 to housing 1480. Cover 1420 can be attached to guide loop 1470. Flexible circuit board 1490, which can be the same as or similar to flexible circuit board 240 (shown in FIG. 2), can connect connector receptacle 1440 to circuitry 1492.

Figure 15:
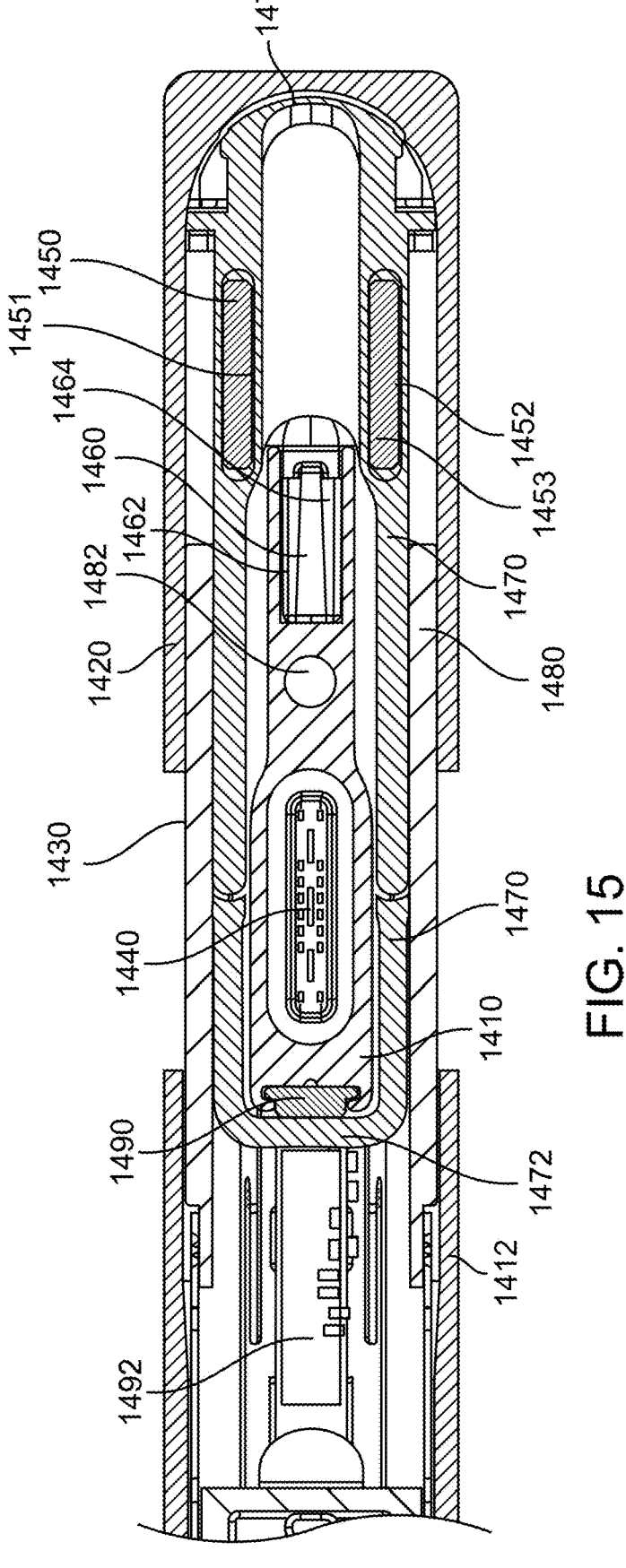
FIG. 15 is a cutaway side view of the electronic device of FIG. 14.

Cover 1420 can move from the closed position shown here, where section 1430 and connector receptacle 1440 are covered and protected, to an open position shown in FIG. 15, where section 1430 and connector receptacle 1440 are exposed. Cover 1420 can be opened by being slid away from body 1412 until guide loop 1470 engages housing 1410 at first end 1472. This is the configuration shown in FIG. 15. This can expose section 1430 and connector receptacle 1440. Cover 1420 can be closed by being slid towards body 1412 until guide loop 1470 engages housing 1410 at second end 1474 as shown here. The physical relationship of guide loop 1470 and housing 1410 can limit travel of cover 1420.

First magnet 1460 can be positioned such that a first polarity is provided at face 1462 and a second polarity is provided at face 1464. Second magnet 1450 can be positioned such that the first polarity is provided at face 1451. This can put first magnet 1460 and second magnet 1450 in a position where they are opposing or repelling magnets. Similarly, third magnet 1452 can be positioned such that the second polarity is provided at face 1453. Again, this can put first magnet 1460 and third magnet 1452 in a position where they are opposing or repelling magnets.

The relationship of first magnet 1460, second magnet 1450, and third magnet 1452, and the physical constraints provided by guide loop 1470 and housing 1410, can provide a bistable arrangement where cover 1420 has a stable open position and a stable closed position. In the closed position shown here, guide loop 1470 and housing 1410 can engage at second end 1474 of guide loop 1470. The repelling force between first magnet 1460 and second magnet 1450 and the repelling force between first magnet 1460 and third magnet 1452 can maintain cover 1420 in a closed position. As cover 1420 is opened, and second magnet 1450 and third magnet 1452 pass by sides of first magnet 1460, the magnetic repulsion can increase and can push cover 1420 to the open position. In the open position, guide loop 1470 can engage housing 1410 at first end 1472, as shown in FIG. 15. The repelling force between first magnet 1460 and second magnet 1450 and the repelling force between first magnet 1460 and third magnet 1452 can maintain cover 1420 in an open position.

FIG. 15 is a cutaway side view of the electronic device of FIG. 14. Electronic device 1400 can include connector receptacle 1440 supported by housing 1410. First magnet 1460 can be attached to housing 1410. Guide loop 1470 can encircle housing 1410. Guide loop 1470 can include second magnet 1450 and third magnet 1452. Guide loop 1470 can be positioned in housing 1480. Cover 1420 is shown in an open position over housing 1480 and connector receptacle 1440. Housing 1480 can connect to body 1412 of electronic device 1400. Pin 1482 can secure housing 1410 to housing 1480. Cover 1420 can be attached to guide loop 1470. Flexible circuit board 1490 can connect connector receptacle 1440 to circuitry 1492.

Cover 1420 can move from the closed position shown in FIG. 14 where section 1430 and connector receptacle 1440 are covered and protected, to an open position shown here, where section 1430 and connector receptacle 1440 are exposed. Cover 1420 can be opened by being slid away from body 1412 until guide loop 1470 engages housing 1410 at first end 1472. This is the configuration shown here. This can expose section 1430 and connector receptacle 1440. Cover 1420 can be closed by being slid towards body 1412 until guide loop 1470 engages housing 1410 at second end 1474, as shown in FIG. 14. The physical relationship of guide loop 1470 and housing 1410 can limit travel of cover 1420.

First magnet 1460 can be positioned such that a first polarity is provided at face 1462 and a second polarity is provided at face 1464. Second magnet 1450 can be positioned such that the first polarity is provided at face 1451. This can put first magnet 1460 and second magnet 1450 in a position where they are opposing or repelling magnets. Similarly, third magnet 1452 can be positioned such that the second polarity is provided at face 1453. Again, this can put first magnet 1460 and third magnet 1452 in a position where they are opposing or repelling magnets.

The relationship of first magnet 1460, second magnet 1450, and third magnet 1452, and the physical constraints provided by guide loop 1470 and housing 1410, can provide a bistable arrangement where cover 1420 has a stable open position and a stable closed position. In the open position shown here, guide loop 1470 and housing 1410 can engage at first end 1472 of guide loop 1470. The repelling force between first magnet 1460 and second magnet 1450 and the repelling force between first magnet 1460 and third magnet 1452 can maintain cover 1420 in the open position. As cover 1420 is closed, and second magnet 1450 and third magnet 1452 pass by sides of first magnet 1460 and the magnetic repulsion can increase and can push cover 1420 to the closed position. In the closed position shown in FIG. 14, guide loop 1470 can engage housing 1410 at second end 1474. The repelling of first magnet 1460 and second magnet 1450 and the repelling of first magnet 1460 to third magnet 1452 can maintain cover 1420 in the closed position as shown in FIG. 14.

FIG. 16 is an exploded view of the electronic device of FIG. 14. Second magnet 1450 and third magnet 1452 can be attached to guide loop 1470. First magnet 1460 can be inserted into or attached to housing 1410. Housing 1480 can be attached to body 1412 of electronic device 1400. Cover 1420 can be attached to second end 1474 of guide loop 1470. Pin 1482 can attach connector receptacle housing 1410 to housing 1480. While second magnet 1450 and third magnet 1452 are shown, other numbers of magnets can be used, for example one magnet can be attached to guide loop 1470.

Figure 17:
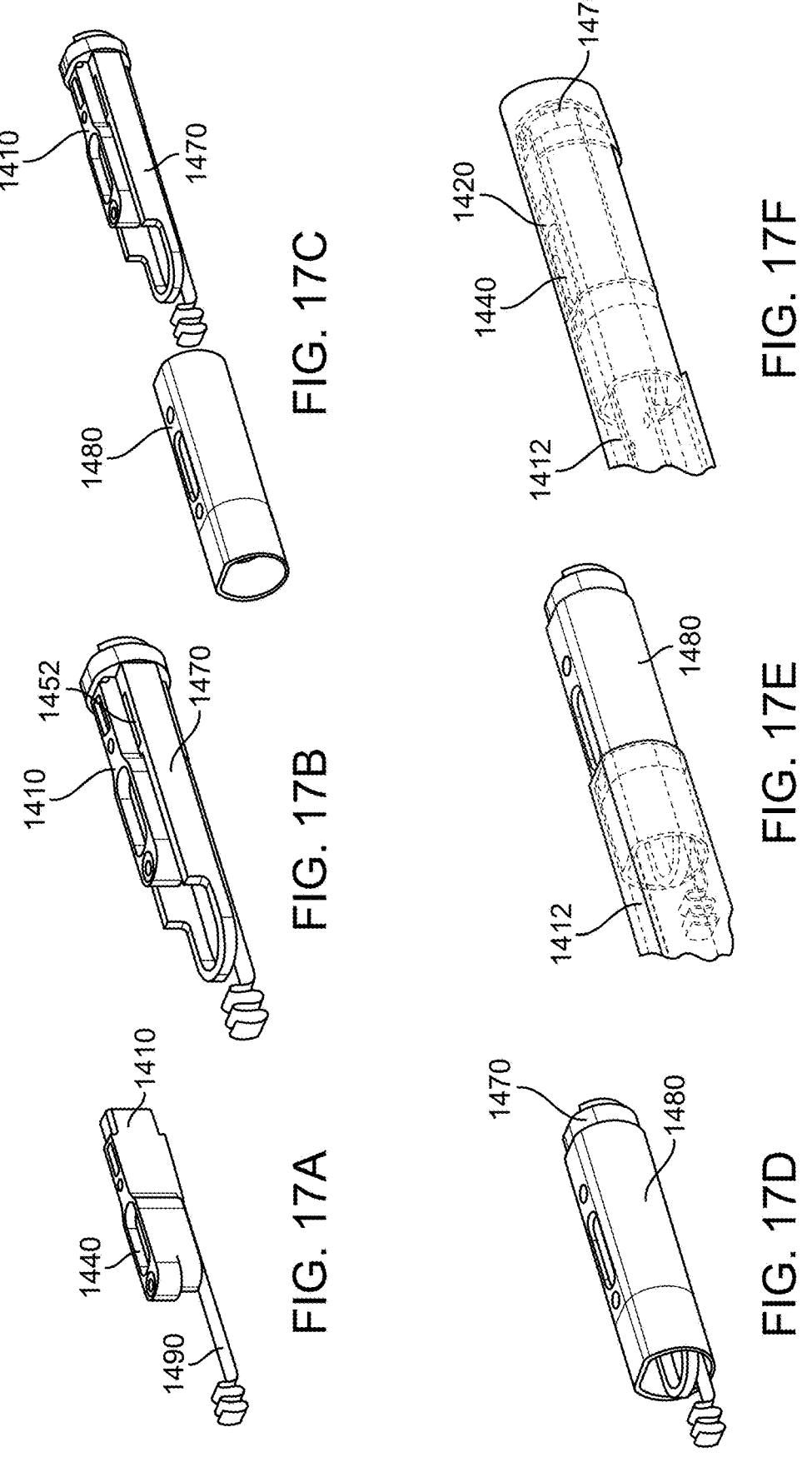

FIG. 17A through FIG. 17 F illustrate steps in manufacturing the electronic device of FIG. 14. In FIG. 17A, flexible circuit board 1490 can be attached to connector receptacle 1440 in connector receptacle housing 1410. In FIG. 17B, guide loop 1470 and second magnet 1450 (shown in FIG. 14), and third magnet 1452 can be positioned around connector receptacle housing 1410. In FIG. 17C, connector receptacle housing 1410 and guide loop 1470 can be slid into housing 1480. In FIG. 17D, guide loop 1470 is shown as being positioned in housing 1480. Housing 1480 can be attached to body 1412 in FIG. 17E. In FIG. 17F, cover 1420 can be attached at an end of guide loop 1470. Connector receptacle 1440 can be covered and protected by cover 1420. Cover 1420 can extend to body 1412.

These and other embodiments of the present can provide a cover that can rotate between a stable open position and a stable closed position. A middle position between the open position and closed position can be unstable due to opposing magnets. The open position can be made stable using the opposing magnets and a first physical constraint and the closed position can be made stable using the opposing magnets and a second physical constraint. The first physical constraint and the second physical constraint can be a pin on a rotating portion engaging stops on a body. An example is shown in the following figures.

Figure 18:
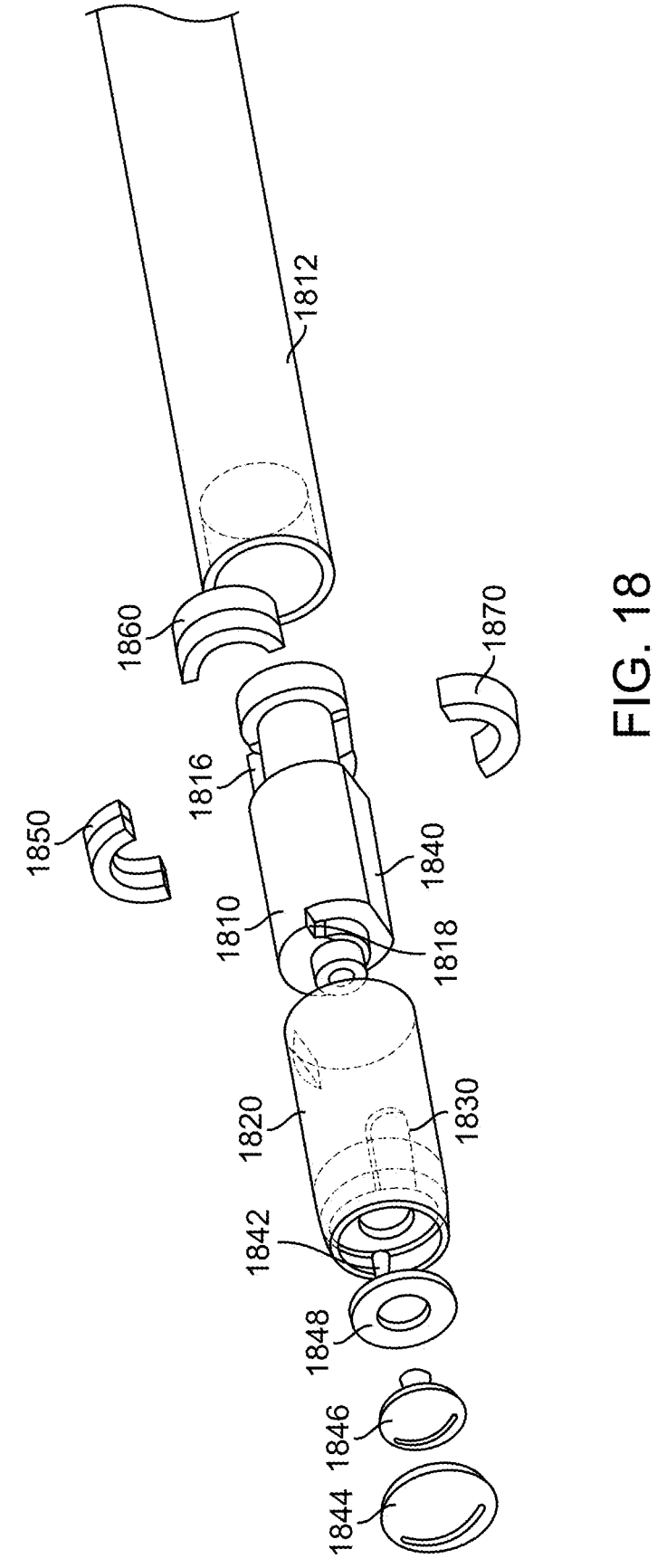
FIG. 18 is an exploded view of an electronic device according to an embodiment of the present invention.

FIG. 18 is an exploded view of an electronic device according to an embodiment of the present invention. Electronic device 1800 can include body 1812. Housing 1810 can be attached to body 1812. Housing 1810 can include connector receptacle 1840. Cover 1820 can be fit over housing 1810. Cover 1820 can rotate along a central axis relative to body 1812 and housing 1810. Cap 1846 and cap 1844 can secure cover 1820 to housing 1410 while allowing cover 1820 to rotate relative to housing 1810. This amount of rotation can be limited by pin 1842. Pin 1842 can extend from ring 1848. Pin 1842 can move through a range defined by a notch defined by stops 1818 in the housing 1810. Bearing 1870 can facilitate the rotational movement of cover 1820 to housing 1810.

First magnet 1850 and second magnet 1860 can be arranged to have the same polarity at opposing faces. This can tend to push first magnet 1850 away from second magnet 1860. One of first magnet 1850 and second magnet 1860 can be attached to cover 1820. For example, first magnet 1850 can be attached to cover 1820. The other of first magnet 1850 and second magnet 1860 can be attached to housing 1810. For example, second magnet 1860 can be located in slot 1816 of housing 1810.

First magnet 1850 and second magnet 1860 can be positioned such that as cover 1820 is rotated relative to housing 1810, the opposing magnetic force between first magnet 1850 and second magnet 1860 can change from a low amount of force to a higher amount of force, and then back to a lower amount of force. This can provide a stable open position where first magnet 1850 and second magnet 1860 have a small amount of overlap, and pin 1842 has reached one of stops 1818 on housing 1810. This can also provide a stable closed position where first magnet 1850 and second magnet 1860 again have a small one of overlap, and pin 1842 has reached the other one of stops 1818 on housing 1810. When cover 1820 is at a midpoint of its rotational range, first magnet 1850 and second magnet 1860 can be aligned, and since their magnetic fields are in opposition, cover 1820 can quickly rotate to either the closed or open position. This changing magnetic field can provide a tactile response to a user as cover 1820 is opened and closed.

Cover 1820 can include opening 1830 which can align with connector receptacle 1840 in an open position. Opening 1830 can align with a different portion of housing 1810 when cover 1820 is in the closed position. This different portion can include text or other pattern, such as a manufacturer's identifying information.

Figures 19A, 19B:
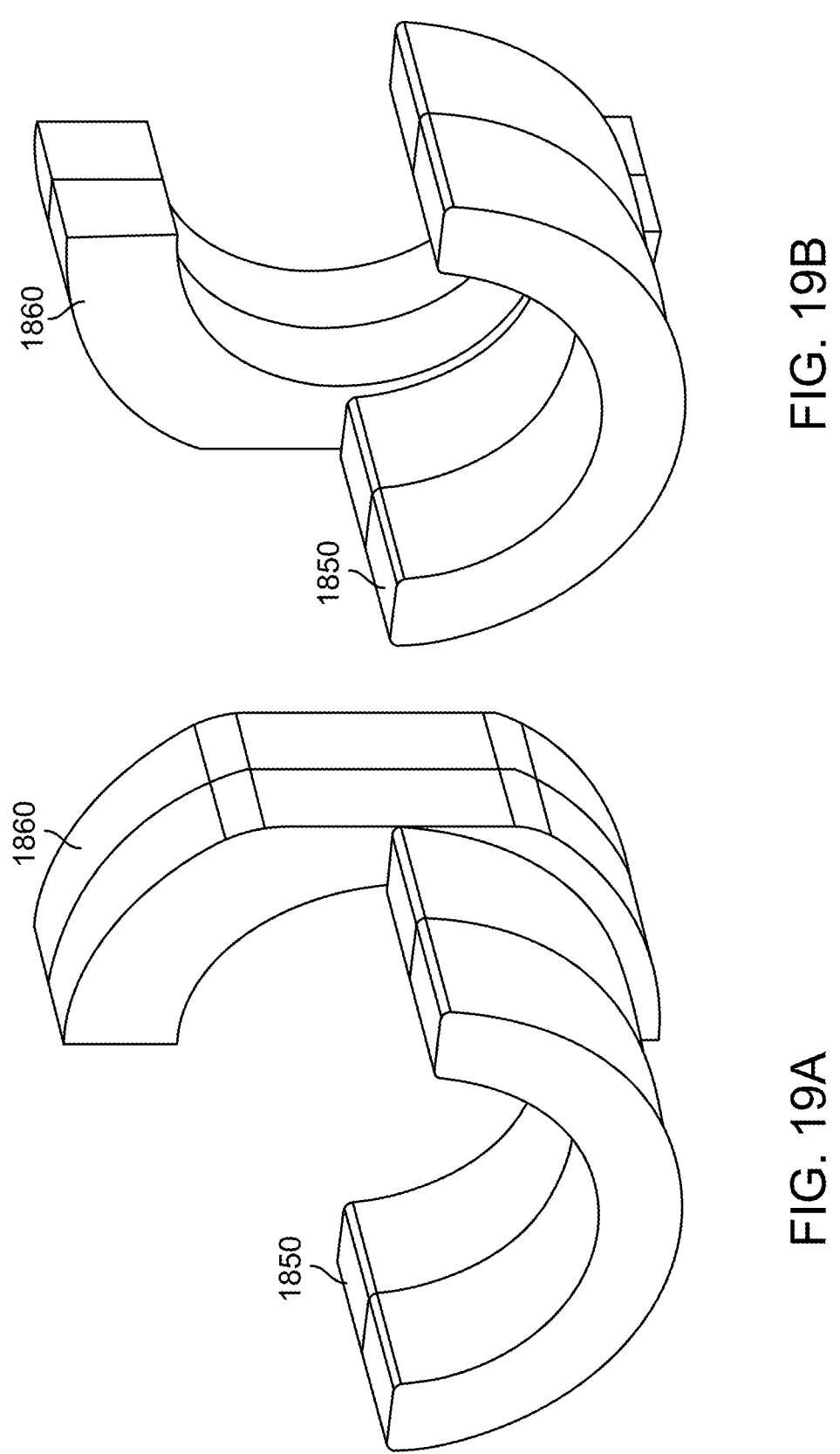
FIG. 19A and FIG. 19B illustrate magnets that can be used in the electronic device of FIG. 18.

FIG. 19A and FIG. 19B illustrate magnets that can be used in the electronic device of FIG. 18. In these figures, first magnet 1850 can be fixed in position, while second magnet 1860 can rotate relative to first magnet 1850. In these two rotational extremes, first magnet 1850 and second magnet 1860 can overlap a minimum amount. As cover 1820 (shown in FIG. 18) changes between an open and a closed position, first magnet 1850 and second magnet 1860 can align, thereby increasing a magnetic repulsion and providing an unstable state between cover 1820 and body 1812 of electronic device 1800 (all shown in FIG. 18.)

These and other embodiments of the present can provide a cover that can provide a distinct open position and closed position by employing a bowed spring. A body of an electronic device can be attached to the bowed spring that can have narrowed ends and a wider center. A cover can be attached to a pin. The cover can slide relative to the bowed spring such that the pin moves to the first narrow end to be in the open position and the second narrow end to be in the closed position. The first narrow end and the second narrow end can both have sloped surfaces that, along with the bowed center, can determine the tactile response provided to a user when opening or closing the cover. An example is shown in the following figures.

Figures 20A, 20B:
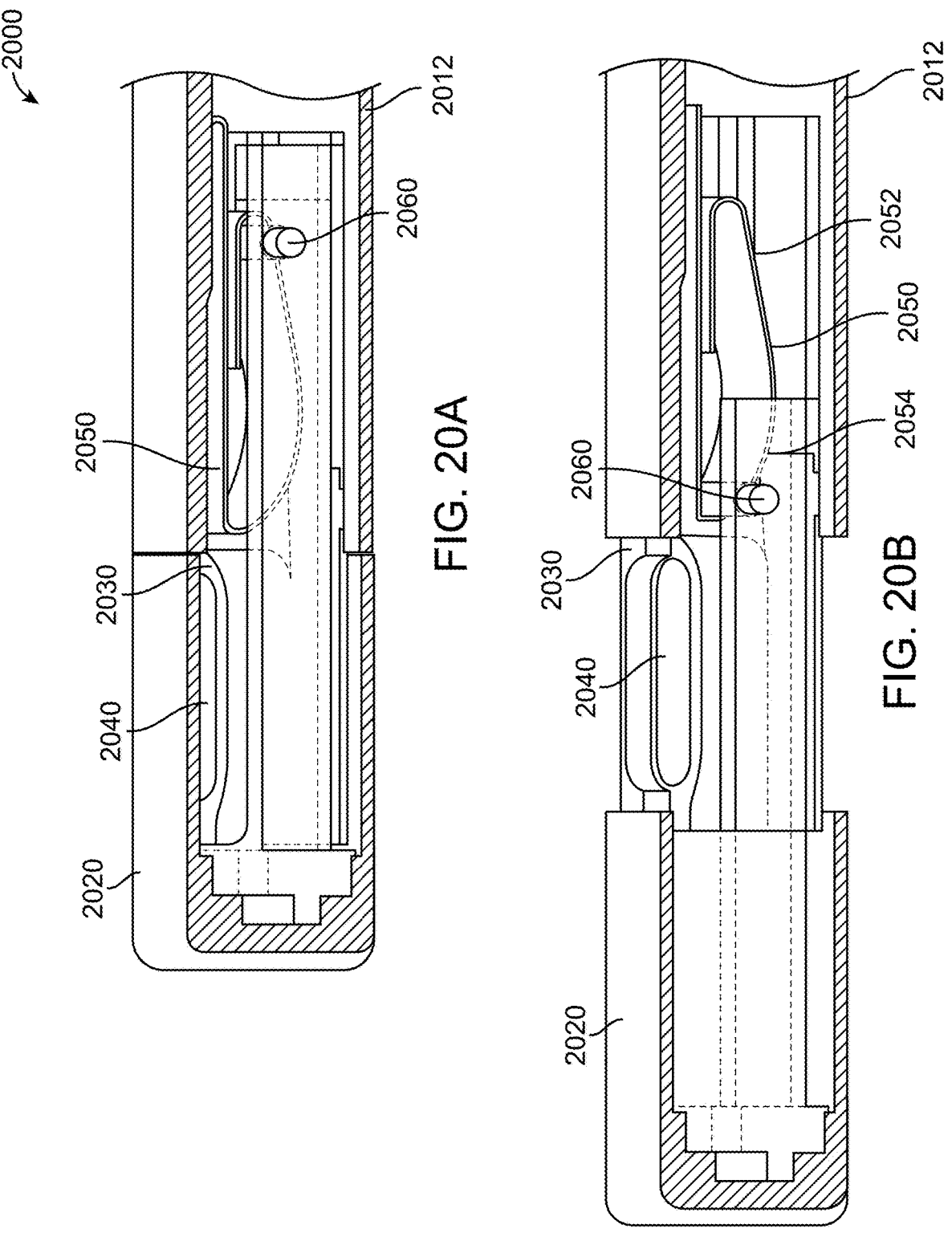
FIG. 20A and FIG. 20B are cutaway side views of an electronic device according to an embodiment of the present invention.

FIG. 20A and FIG. 20B are cutaway side views of an electronic device according to an embodiment of the present invention. In this example, cover 2020 of electronic device 2000 can move between a closed position where section 2030 and connector receptacle 2040 are protected and hidden and an open position where section 2030 and connector receptacle 2040 are accessible. Cover 2020 can be attached to pin 2060. Pin 2060 can ride along a lower surface of spring 2050 as cover 2020 is open and closed. Spring 2050 can be attached to body 2012. Pin 2060 can be at narrow end 2052 of spring 2050 when cover 2020 is in a closed position and at narrow end 2054 of spring 2050 when cover 2020 is in an open position. Spring 2050 can include a widened portion of the between narrow end 2052 and narrow end 2054. As pin 2060 engages the wide portion of spring 2050, a force on pin 2060 and therefore on cover 2020, can increase. This force can provide a tactile response to a user as cover 2020 is moved between an open position and a closed position. Narrow end 2052 can provide a stable state for the closed position, while narrow end 2054 can provide a stable state for the open position. Spring 2050 can be formed of metal, spring steel, plastic, or other flexible material.

Figure 21:
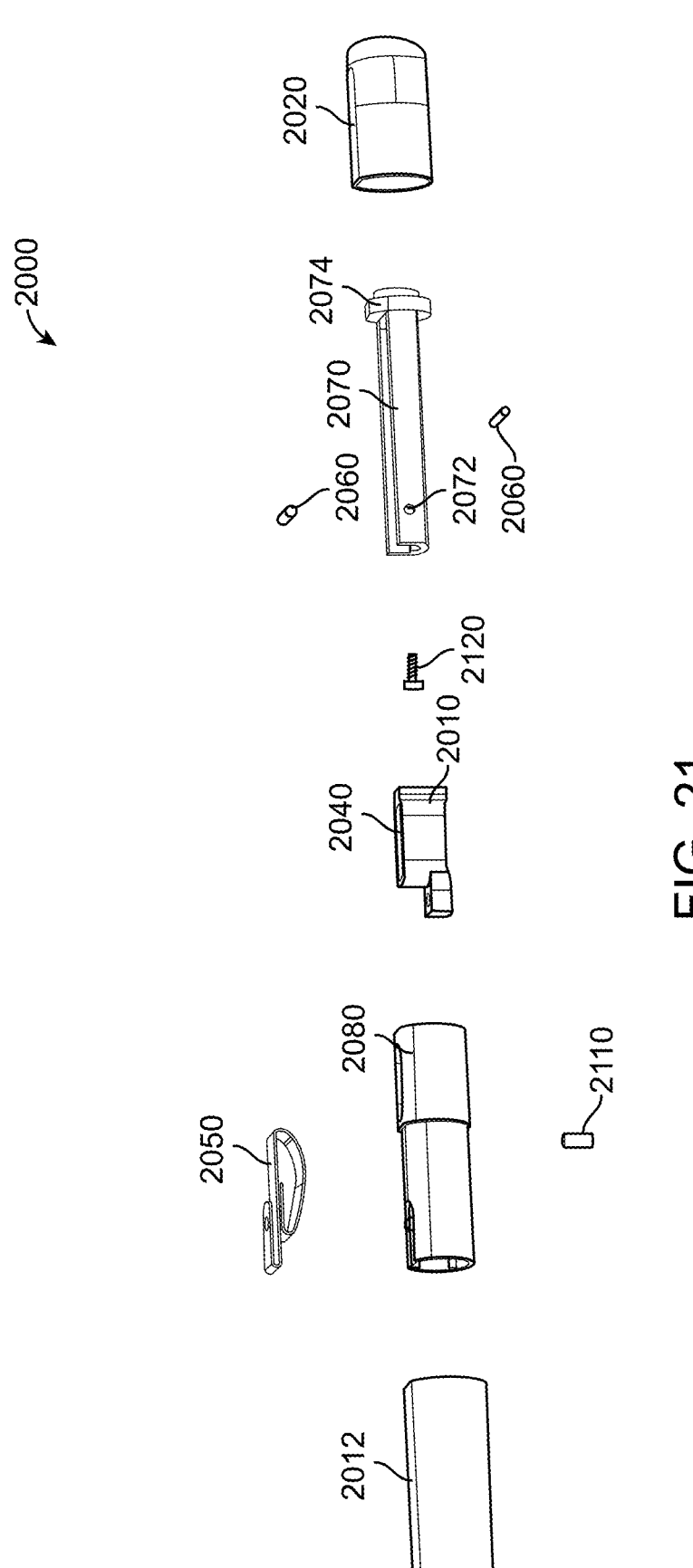
FIG. 21 is an exploded view of the electronic device of FIG. 20A and FIG. 20B.

FIG. 21 is an exploded view of the electronic device of FIG. 20A and FIG. 20B. Electronic device 2000 can include body 2012. Housing 2080 can be partially inserted into body 2012. Pin 2110 can secure spring 2050 to housing 2080. Housing 2010 for connector receptacle 2040 can be attached to housing 2080 with fastener 2120. Pins 2060 can be inserted into openings 2072 in slider 2070. Cover 2020 can be attached to an end 2074 of slider 2070. Cover 2020 and slider 2070 can slide relative to spring 2050, housing 2010, and housing 2080 as cover 2020 moves between an open and a closed position. While two pins 2060 are shown, one or more than two pins 2060 can be used.

In these and other bottoms of the present invention, a cover can be absent and a connector receptacle can be made available at all times. An example is shown in the following figure.

Figures 22A, 22B, 22C:
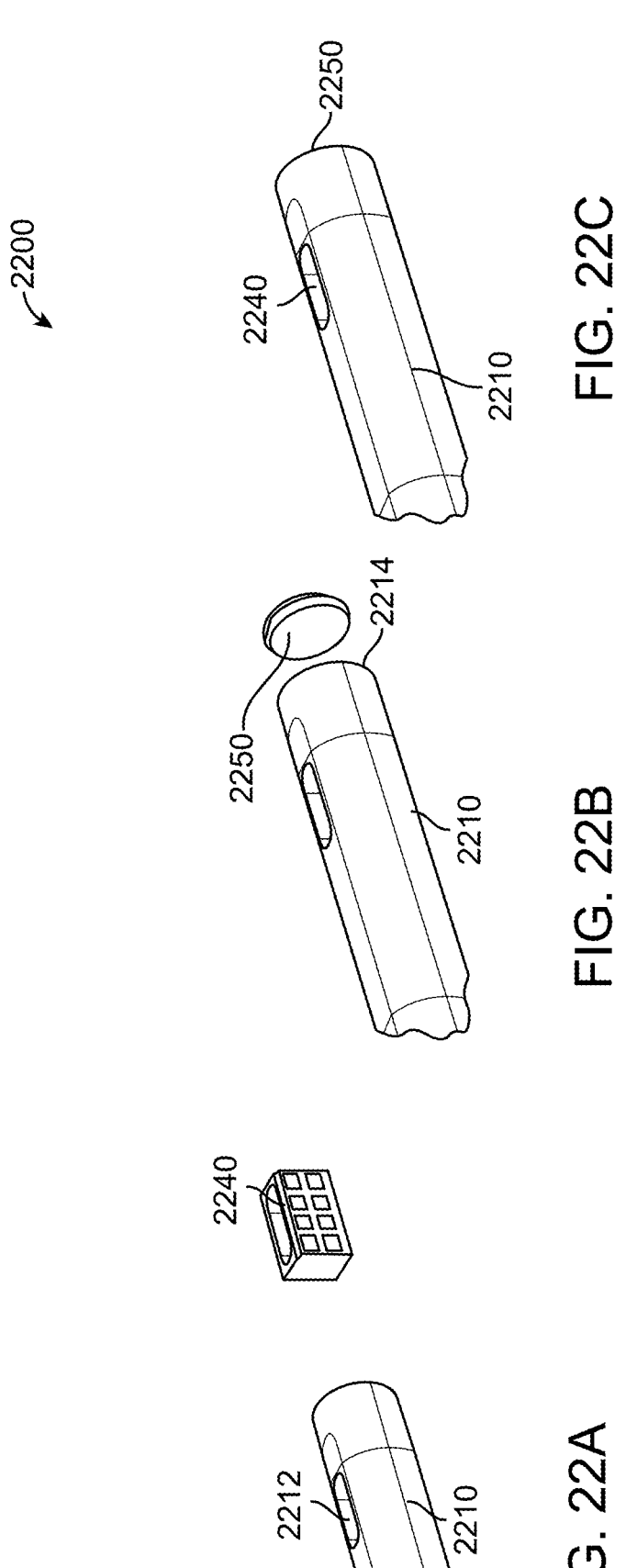
FIG. 22A through FIG. 22C illustrate steps in the manufacturing of an electronic device according to an embodiment of the present invention.

FIG. 22A through FIG. 22C illustrate steps in the manufacturing of an electronic device according to an embodiment of the present invention. In FIG. 22A, connector receptacle 2240 of electronic device 2200 can be inserted into housing 2210 and aligned with opening 2212. In FIG. 22B, an end cap 2250 can be attached to housing 2210 at end 2214. In FIG. 22C, connector receptacle 2240 can be accessible in housing 2010 and sealed by end cap 2250.

These and other embodiments of the present can provide a cover that can provide a distinct open position and closed position by employing a differential bowed spring. The cover can include a puck on a bottom side. The puck can be at a first end of the differential bowed spring for the open position and at the second end of the differential bowed spring for the closed position. The differential bowed spring can provide a force on each side of the puck during the transition. This force can provide a stable closed position and a stable open position. The force of the differential bowed spring can provide a tactile response to a user when opening or closing the cover. An example is shown in the following figures.

Figures 23A, 23B:
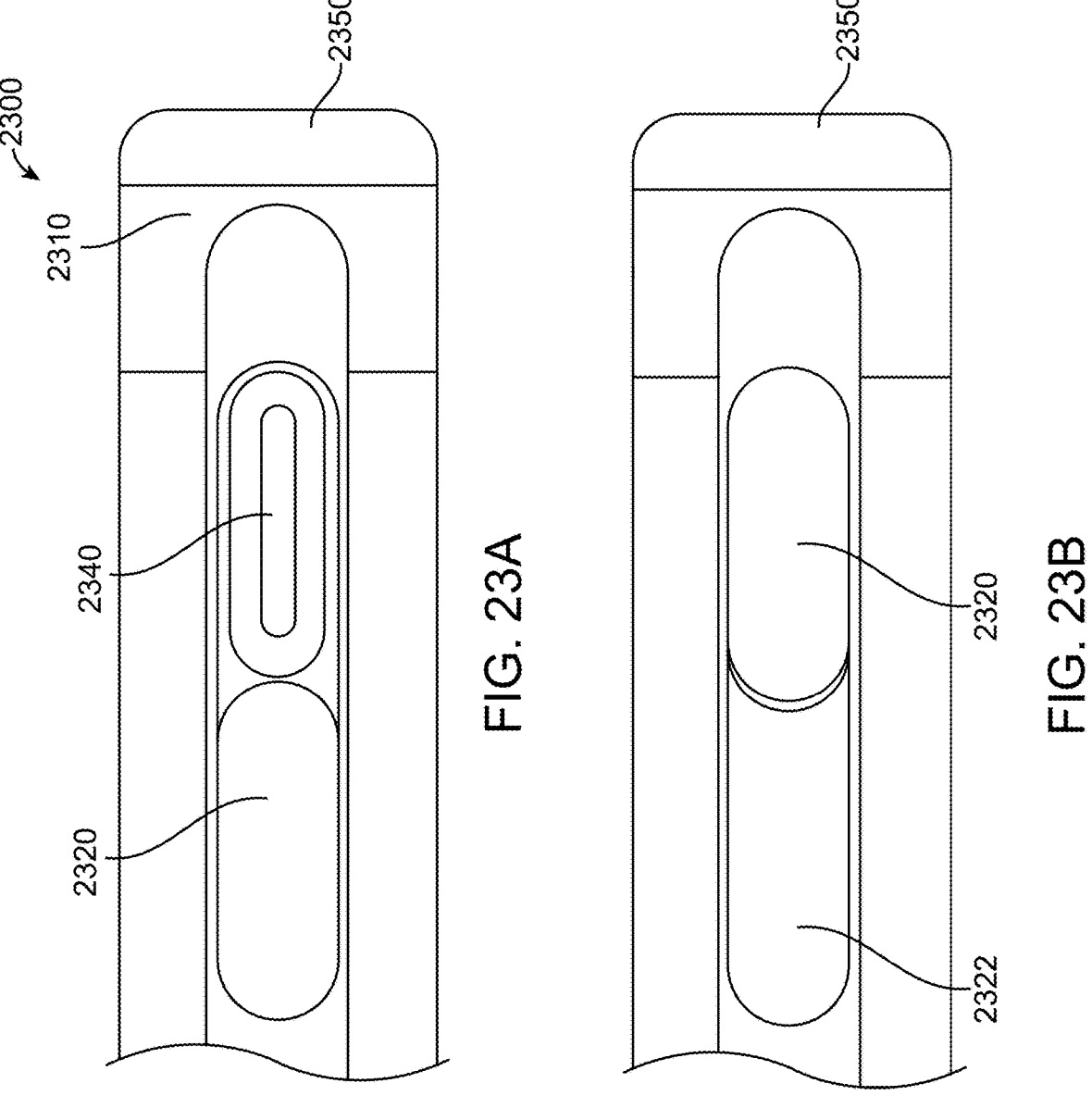
FIG. 23A and FIG. 23B illustrate an electronic device according to an embodiment of the present invention.

FIG. 23A and FIG. 23B illustrate an electronic device according to an embodiment of the present invention. Electronic device 2300 can include cover 2320 that can move from an open position where connector receptacle 2340 is available to a closed position where connector receptacle 2340 is closed. Cover 2320 can include extension 2322. Housing 2310 can be sealed at an end by end cap 2350.

FIG. 24 is an exploded view of electronic device of FIG. 23A and FIG. 23B. Housing 2490 can include connector receptacle 2340. Housing 2490 of electronic device 2300 can fit in housing 2310 (shown in FIG. 23.) End cap 2350 can seal an end of housing 2310. Frame 2460 can be attached to housing 2490. Cover 2320 can slide along the frame 2460. Cover 2320 can include extension 2322 having puck 2324 on an underside. Puck 2324 can engage differential bowed springs 2740, which can be held in place by support 2480. Differential bowed springs 2740 can be formed of metal, spring steel, plastic, or other flexible material.

Figure 25A:
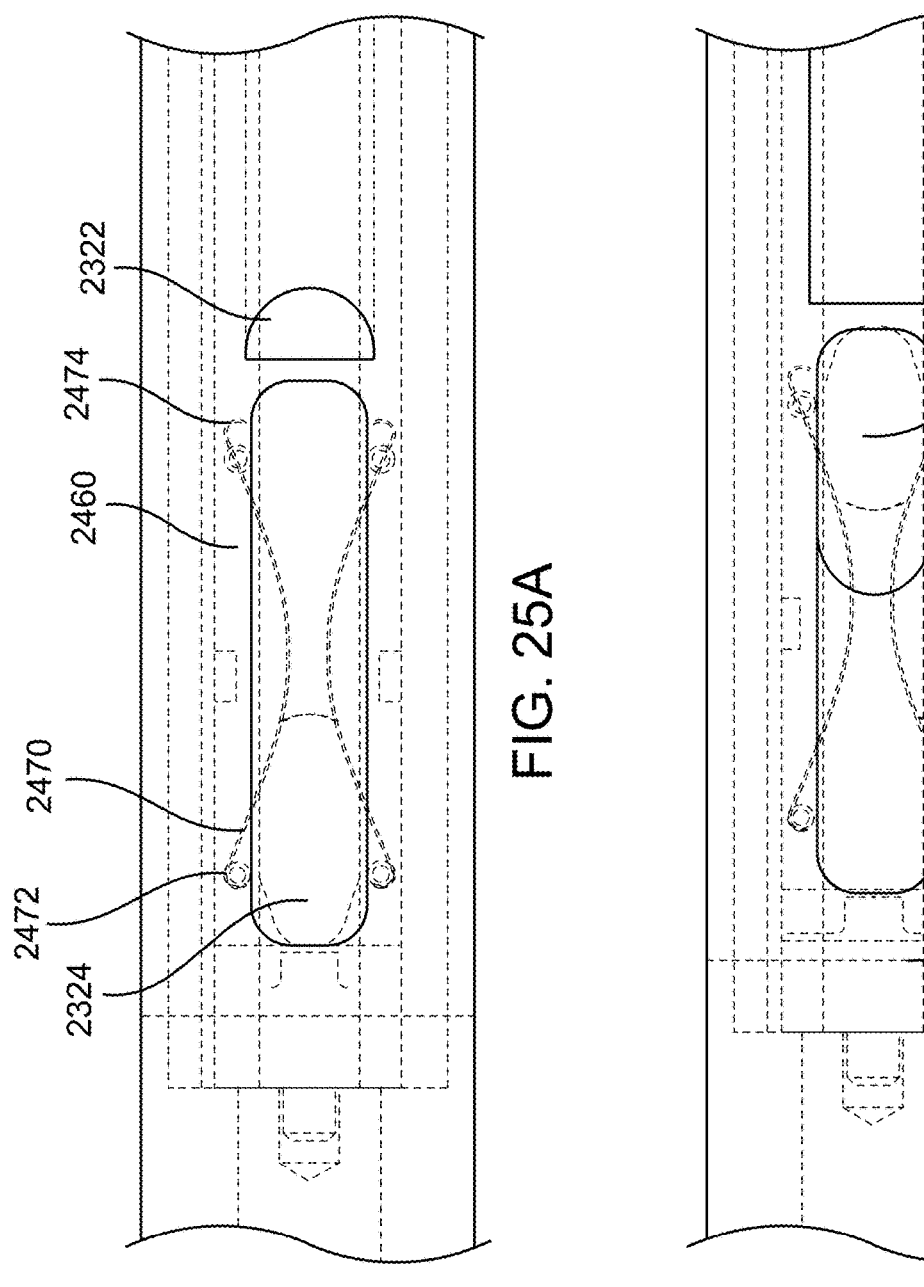
FIG. 25A and FIG. 25B illustrate the operation of the cover for the electronic device shown in FIG. 23A and FIG. 23B.
Figure 25B:
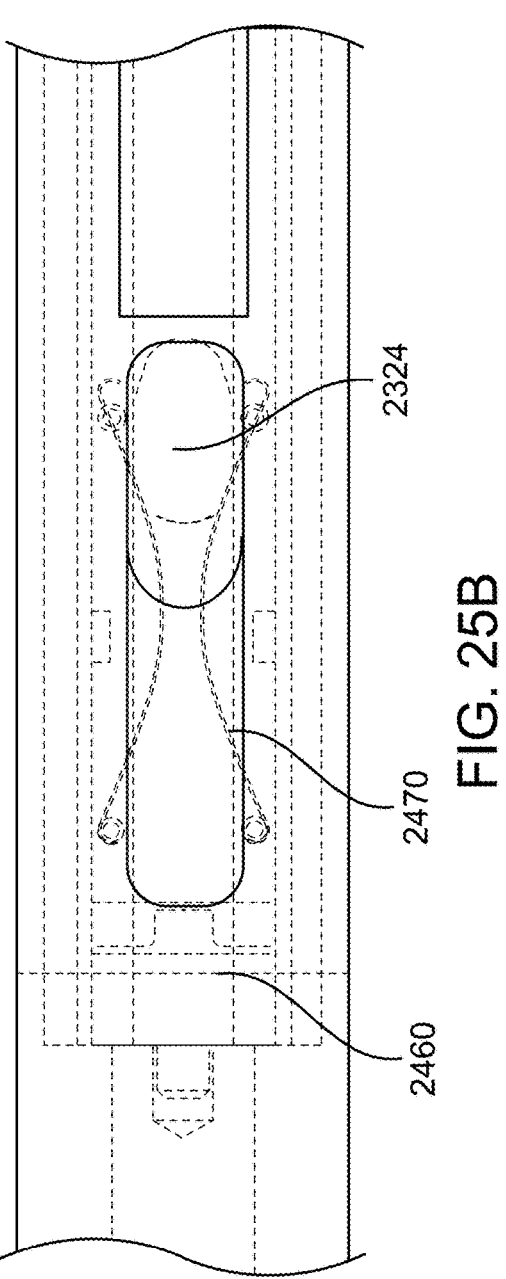

FIG. 25A and FIG. 25B illustrate the operation of the cover for the electronic device shown in FIG. 23A and FIG. 23B. As shown, puck 2324 can slide to be located at first end 2472 (in FIG. 25A) of differential bowed springs 2470 and at second end 2474 (in FIG. 25B) of bowed springs 2470. Puck 2324 can be attached to extension 2322 of cover 2320 (shown in FIG. 23A.) Cover 2320 can slide along frame 2460. As cover 2320 moves between an open position and a closed position, puck 2324 can traverse differential bowed springs 2470. Between first end 2472 and second end 2474 of differential bowed springs 2470, differential bowed springs 2470 can exert and increasing force on puck 2324. This force can tend to drive puck 2324 to either first end 2472 or second end 2474 of differential bowed springs 2470. This force can provide a tactile response to a user as cover 2320 is moved between an open position and a closed position. This force can also provide a stable open position and a stable closed position for cover 2320.

These and other embodiments of the present can provide a cover that can provide a distinct open position and closed position by employing a differential clamp. The differential clamp can include a first prong and a second prong having facing portions that are angled. The first prong and a second prong can be flexible. When the cover is closed, the differential clamp can open to secure sloped features in an interior guide attached to the cover. When the cover is opened, the differential clamp can open to release the sloped features in the interior guide. An example is shown in the following figures.

Figure 26:
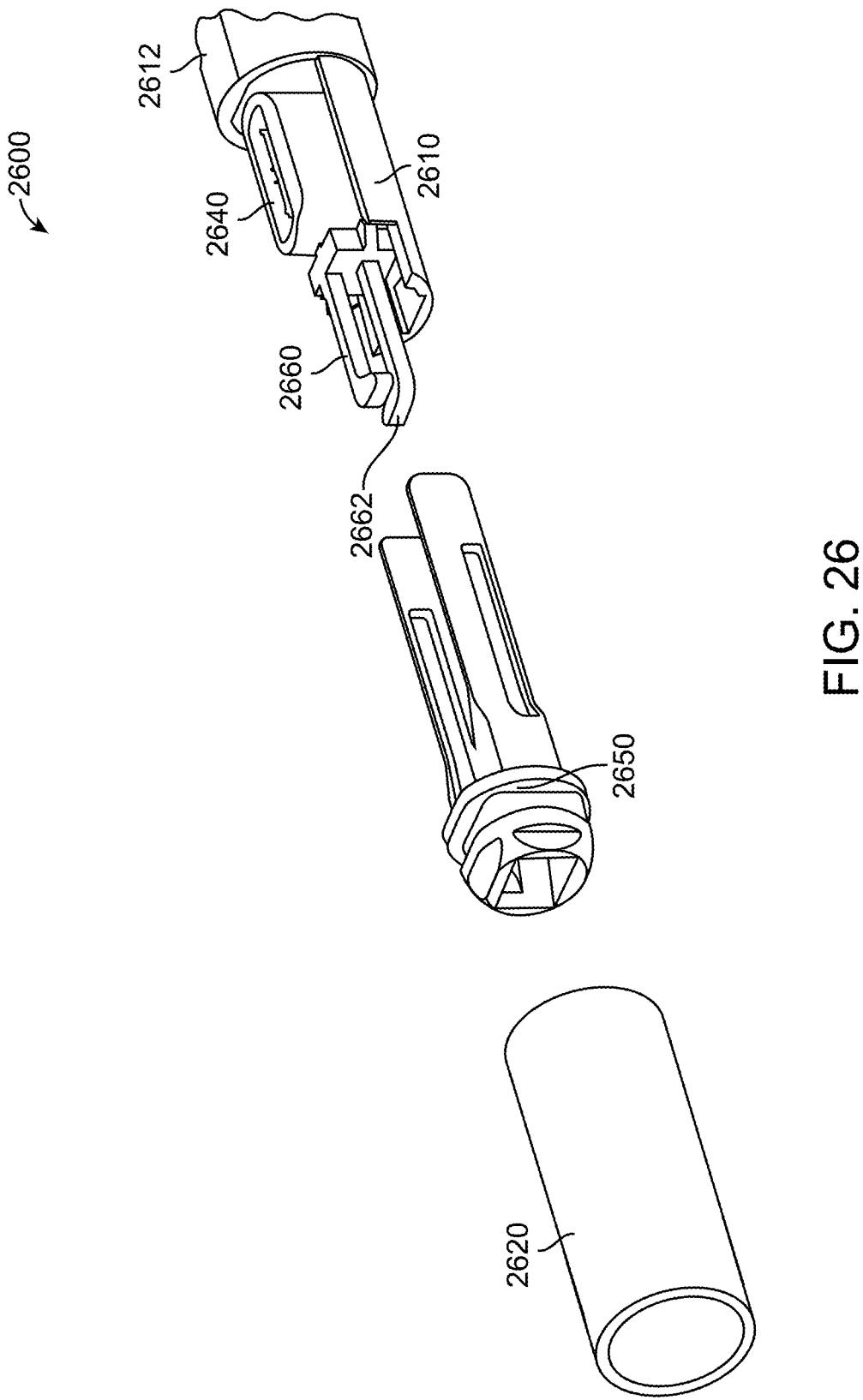
FIG. 26 illustrates an electronic device according to an embodiment of the present invention.

FIG. 26 illustrates an electronic device according to an embodiment of the present invention. Electronic device 2600 can include body 2612 supporting housing 2610. Housing 2610 can support connector receptacle 2640. Differential clamp 2660 can be attached to housing 2610. Differential clamp 2660 can include angle portions 2662. Differential clamp 2660 can be flexible to secure and release features in interior guide 2650. Interior guide 2650 can be attached to cover 2620. Cover 2620 can slide relative to body 2612 to either cover or exposed connector receptacle 2640. This is shown further in the following figure.

Figures 27A, 27B, 27C:
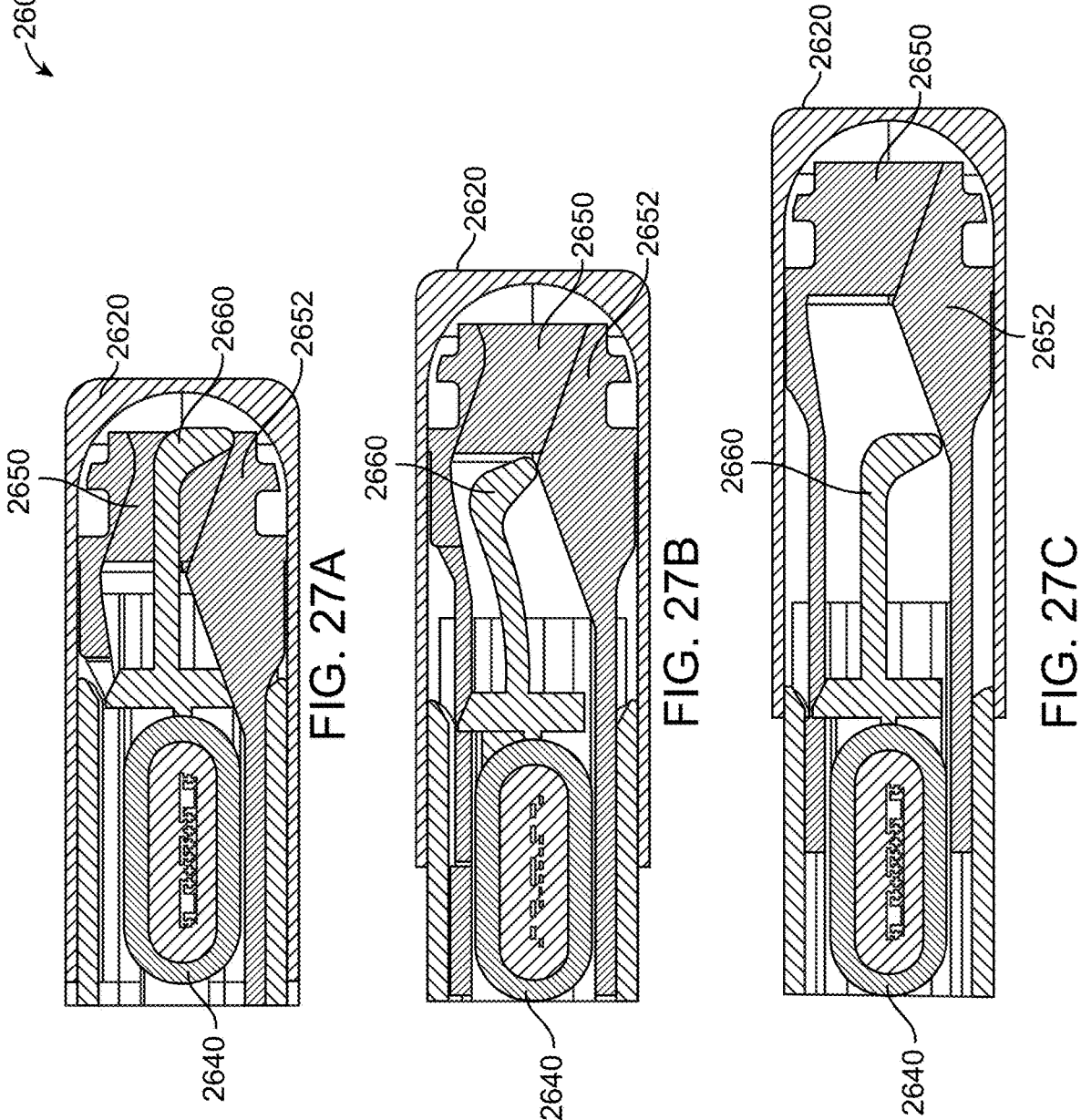
FIG. 27A through FIG. 27C illustrate the operation of cover features for the electronic device of FIG. 26.

FIG. 27A through FIG. 27C illustrate the operation of cover features for the electronic device of FIG. 26. In FIG. 27A, cover 2620 is closed and one side of differential clamp 2660 is shown as having secured sloped feature 2652 in interior guide 2650. Interior guide 2650 can be attached to cover 2620. In FIG. 27B, cover 2620 can be pulled away from connector receptacle 2640. The illustrated side of differential clamp 2660 can slide along sloped feature 2652 of interior guide 2650. In FIG. 27C, connector receptacle 2640 can be uncovered by cover 2620 and can be available for charging or data transfers. One side of differential clamp 2660 is shown as having released sloped feature 2652 of interior guide 2650. Differential clamp 2660 can be formed of metal, spring steel, plastic, or other flexible material.

These and other embodiments of the present can provide a cover that can provide a distinct open position and closed position by employing an anvil that can engage a differential metal slider. The anvil can be attached to a connector receptable housing. The differential metal slider can be attached to an interior guide that is attached to the cover. The cover can move between a closed position and an open position by passing the anvil through the differential metal slider. The differential metal slider can provide a force on sides of the anvil. This force can provide a stable closed position and a stable open position. The force of the differential metal slider can provide a tactile response to a user when opening or closing the cover. An example is shown in the following figures.

Figure 28:
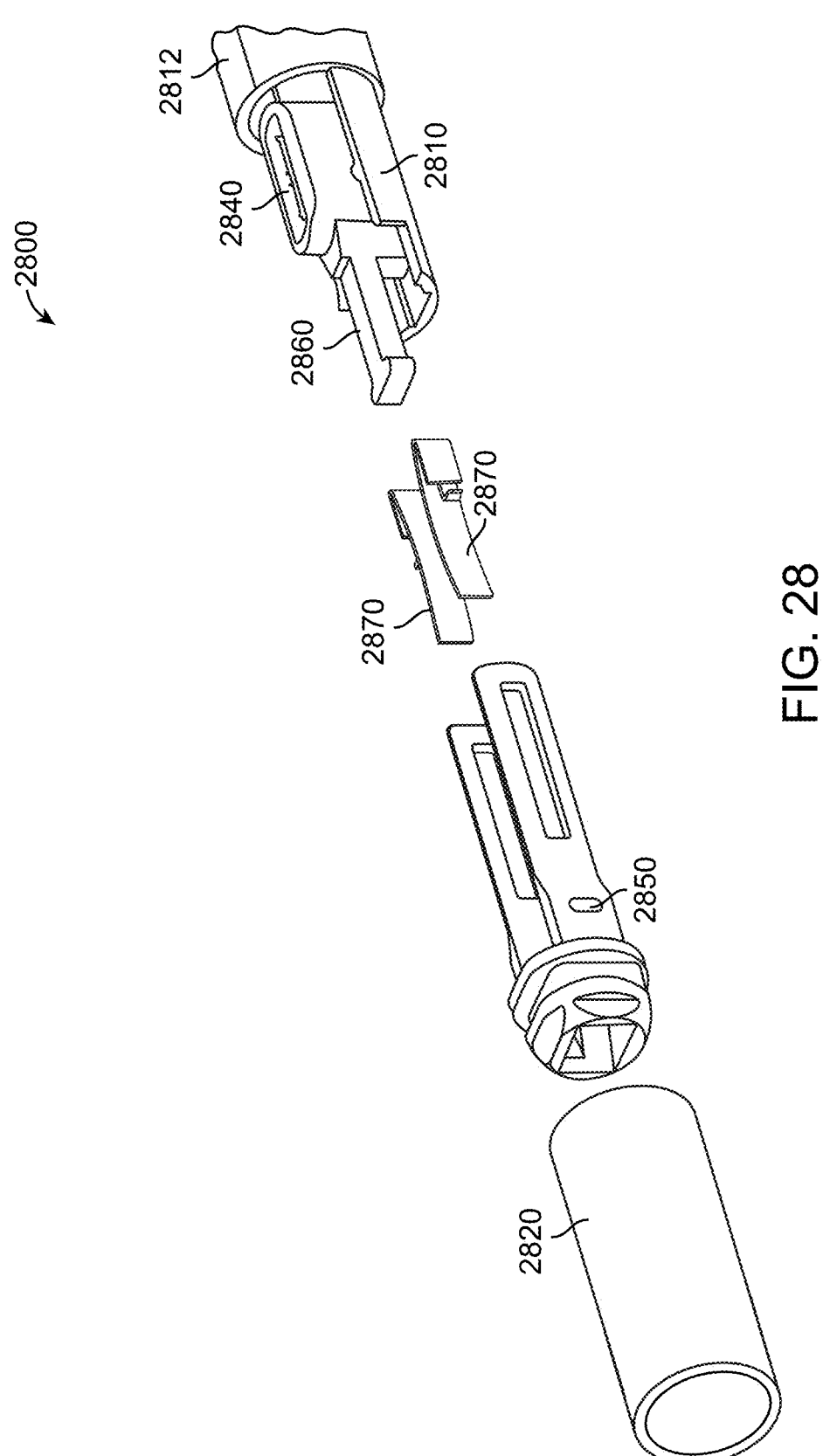
FIG. 28 illustrates an electronic device according to an embodiment of the present invention.

FIG. 28 illustrates an electronic device according to an embodiment of the present invention. Electronic device 2800 can include body 2812. Body 2812 can support housing 2810, which can support connector receptacle 2840. Anvil 2860 can be attached to housing 2010. Differential metal sliders 2870 can be attached to interior guide 2850. Interior guide 2850 can be attached to cover 2820. Anvil 2860 can traverse a path through differential metal slider 2870 as cover 2820 moves between an open position and a closed position. This is shown further in the following figure.

Figures 29A, 29B, 29C:
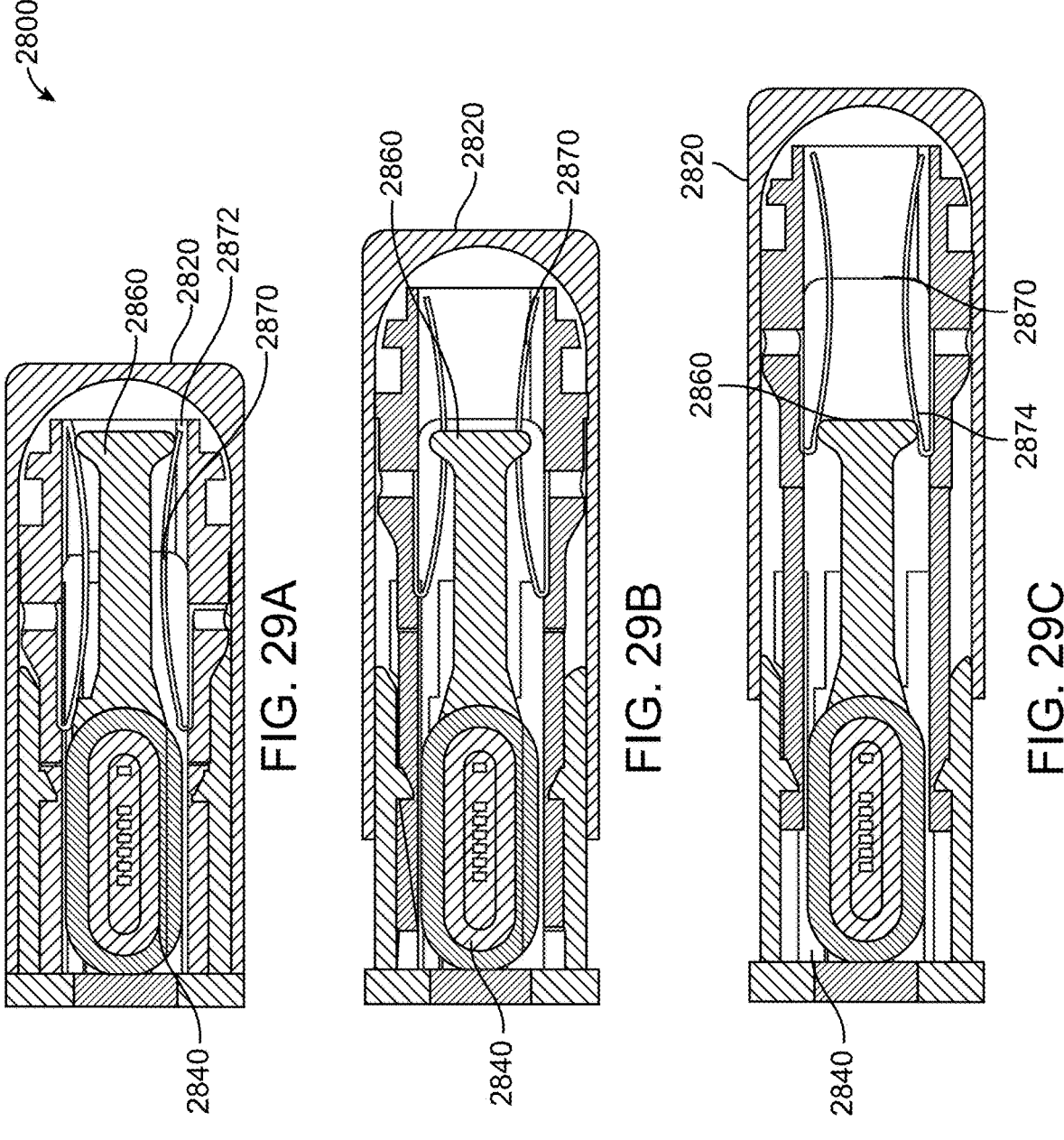
FIG. 29A through FIG. 29C illustrate the operation of cover features for the electronic device of FIG. 28.

FIG. 29A through FIG. 29C illustrate the operation of cover features for the electronic device of FIG. 28. In FIG. 29A, cover 2820 of electronic device 2800 can cover connector receptacle 2840. Anvil 2860 can be at a first end 2872 of differential metal slider 2870. In FIG. 29B, anvil 2860 can traverse the length of differential metal slider 2870 as cover 2820 begins to expose connector receptacle 2840. At this position, differential metal slider 2870 can apply forces on sides of anvil 2860, thereby making this an unstable state. In FIG. 29C, cover 2820 can be fully open thereby making connector receptacle 2840 accessible for charging or data transfers. Anvil 2860 can be located at second end 2874 of differential metal slider 2870. Differential metal slider 2870 can be formed of metal, spring steel, plastic, or other flexible material.

Connector receptacle 140 and its features, such as tongue 210, contacts 220, frame 230, and other features as shown in FIG. 2, can be used as connector receptacle 1040 in FIG. 10, connector receptacle 1440 in FIG. 14, connector receptacle 1840 in FIG. 18, connector receptacle 2040 in FIG. 20A, connector receptacle 2240 in FIG. 22, connector receptacle 2340 in FIG. 23, connector receptacle 2640 in FIG. 26, connector receptacle 2840 in FIG. 28, and other connector receptacles herein or otherwise provided by embodiments of the present invention. Reference numbers are used in a consistent manner throughout this specification.

In various embodiments of the present invention, conductive portions of an electronic device can be formed by stamping, metal-injection molding, machining, micro-machining, 3-D printing, or other manufacturing process. The conductive portions can be formed of stainless steel, steel, copper, copper titanium, phosphor bronze, or other material or combination of materials. They can be plated or coated with nickel, gold, or other material. The nonconductive portions, such as housings, covers, and other structures can be formed using injection or other molding, 3-D printing, machining, or other manufacturing process. The nonconductive portions can be formed of silicon or silicone, rubber, hard rubber, plastic, nylon, liquid-crystal polymers (LCPs), ceramics, or other nonconductive material or combination of materials. The springs and metal sliders can be formed of spring steel or other material.

Embodiments of the present invention can provide covers and connector receptacles for various types of devices, such as portable computing devices, tablet computers, desktop computers, laptops, all-in-one computers, wearable computing devices, cell phones, smart phones, media phones, storage devices, portable media players, navigation systems, monitors, power supplies, writing implements, video delivery systems, adapters, remote control devices, chargers, and other devices. These connector adapters can provide interconnect pathways for signals that are compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. Other embodiments of the present invention can provide connector receptacles that can be used to provide a reduced set of functions for one or more of these standards. In various embodiments of the present invention, these interconnect paths provided by these connector receptacles can be used to convey power, ground, signals, test points, and other voltage, current, data, or other information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device comprising:
a body; and
a cover configured to slide away from the body to an open position to expose a connector receptacle and configured to slide towards the body to a closed position to cover the connector receptacle,
wherein the open position is defined by a first magnet and a second magnet and a first physical constraint, and the closed position is defined by the first magnet and second magnet and a second physical constraint.

2. The electronic device of claim 1 further comprising a first structure and a second structure, wherein the first physical constraint comprises the first structure engaging the second structure and the second physical constraint comprises the first structure engaging the second structure.

3. The electronic device of claim 2 wherein the second structure is a housing for the connector receptacle.

4. The electronic device of claim 3 wherein the first structure is a guide loop around the housing for the connector receptacle.

5. The electronic device of claim 4 wherein the guide loop is attached to the cover.

6. The electronic device of claim 5 wherein the first magnet is attached to the housing for the connector receptacle and the second magnet is attached to the guide loop.

7. The electronic device of claim 6 wherein a first polarity of the first magnet faces the first polarity of the second magnet.

8. The electronic device of claim 7 wherein when the cover is closed, the second magnet is between the connector receptacle and the first magnet and when the cover is open, the first magnet is between the connector receptacle and the second magnet.

9. The electronic device of claim 8 further comprising a third magnet, the third magnet on the guide loop such that the third magnet and the second magnet are on opposite sides of the housing for the connector receptacle.

10. The electronic device of claim 9 wherein a second polarity of the third magnet faces the second polarity of the first magnet.

11. The electronic device of claim 8 wherein the connector receptacle is a Universal Serial Bus Type-C connector receptacle.

12. An electronic device comprising:
an elongated body;

a connector receptacle located in a connector receptacle housing, the connector receptacle housing fixed to the elongated body;
a cover configured circumferentially around and covering an end of the electronic device, wherein the cover is movable between a closed position covering the connector receptacle and an open position exposing the connector receptacle;
a first magnet fixed to the cover;
a second magnet fixed to the connector receptacle housing; and
a third magnet fixed to the cover, wherein a first polarity of the first magnet faces the first polarity of the second magnet such that the first magnet and the second magnet are repelling magnets, and a second polarity of the second magnet faces the second polarity of the third magnet such that the second magnet and the third magnet are repelling magnets.

13. The electronic device of claim 12 wherein when the cover is in the closed position, the first and third magnets are on a first side of the second magnet, and when the cover is in the open position, the first and third magnets are on a second side of the second magnet.

14. The electronic device of claim 13 wherein when the cover is in the closed position, repelling magnetic forces between the first magnet and the second magnet and between the third magnet and the second magnet hold the cover in the closed position, and when the cover is in the open position, repelling magnetic forces between the first magnet and the second magnet and between the third magnet and the second magnet hold the cover in the open position.

15. The electronic device of claim 14 wherein the elongated body has a cylindrical shape with a flat surface.

16. The electronic device of claim 15 wherein the electronic device is an electronic writing implement.

17. An electronic device comprising:
an elongated body;
a connector receptacle located in a connector receptacle housing, the connector receptacle housing fixed to the elongated body;
a cover configured circumferentially around and covering an end of the electronic device, wherein the cover is movable between a closed position covering the connector receptacle and an open position exposing the connector receptacle;
a guide loop attached to the cover, the guide loop circumferentially around the connector receptacle housing;
a first magnet fixed to the cover; and
a second magnet fixed to the connector receptacle housing, wherein a first polarity of the first magnet faces the first polarity of the second magnet such that the first magnet and the second magnet are repelling magnets.

18. The electronic device of claim 17 wherein when the cover is in the closed position, a first end of the connector receptacle housing engages a first end of the guide loop, and when the cover is in the open position, a second end of the connector receptacle housing engages a second end of the guide loop.

19. The electronic device of claim 18 wherein when the cover is in the closed position, a repelling magnetic force between the first magnet and the second magnet hold the cover in the closed position, and when the cover is in the open position, a repelling magnetic force between the first magnet and the second magnet hold the cover in the open position.

20. The electronic device of claim 19 wherein the elongated body has a cylindrical shape with a flat surface and wherein the electronic device is an electronic writing implement.

\* \* \* \* \*